United States Patent
Chan et al.

(10) Patent No.: US 11,070,035 B2
(45) Date of Patent: Jul. 20, 2021

(54) MODULAR ELECTRO-MAGNETIC CONNECTIONS AND APPLICATIONS THEREOF

(71) Applicant: Ecco Design, Inc., New York, NY (US)

(72) Inventors: Eric Ping Pang Chan, New York, NY (US); Michael Morath, Baden-Wuerttemberg (DE)

(73) Assignee: ECCO Design, Inc., New York, NY (US)

( * ) Notice: Subject to any disclaimer, the term of this patent is extended or adjusted under 35 U.S.C. 154(b) by 0 days.

(21) Appl. No.: 16/659,613

(22) Filed: Oct. 22, 2019

(65) Prior Publication Data

US 2021/0119422 A1    Apr. 22, 2021

(51) Int. Cl.
| | |
|---|---|
| *H01F 7/06* | (2006.01) |
| *H02B 1/20* | (2006.01) |
| *H01F 7/02* | (2006.01) |
| *H01R 13/62* | (2006.01) |

(52) U.S. Cl.
CPC .............. *H02B 1/202* (2013.01); *H01F 7/02* (2013.01); *H01R 13/6205* (2013.01); *H01F 2007/062* (2013.01)

(58) Field of Classification Search
None
See application file for complete search history.

(56) References Cited

U.S. PATENT DOCUMENTS

| | | | |
|---|---|---|---|
| 7,641,477 B2 | 1/2010 | DiFonzo et al. | |
| 7,726,974 B2 * | 6/2010 | Shah | H05B 47/185 |
| | | | 439/40 |
| 8,240,894 B2 * | 8/2012 | Sanroma | A47F 3/001 |
| | | | 362/398 |
| 8,766,484 B2 * | 7/2014 | Baarman | H01F 38/14 |
| | | | 307/104 |
| 9,531,118 B2 * | 12/2016 | Byrne | H01R 13/6205 |
| 9,614,378 B2 | 4/2017 | Golko et al. | |
| 2009/0284988 A1 * | 11/2009 | Snagel | F21V 29/70 |
| | | | 362/648 |
| 2010/0314655 A1 * | 12/2010 | Thompson | H05K 1/189 |
| | | | 257/99 |

(Continued)

FOREIGN PATENT DOCUMENTS

| | | |
|---|---|---|
| JP | 2012-234811 A | 11/2012 |
| WO | 2017152183 A1 | 9/2017 |

OTHER PUBLICATIONS

International Search Report and Written Opinion for Application No. PCT/US2017/020977 dated Jun. 14, 2017.

(Continued)

*Primary Examiner* — Courtney L Smith
(74) *Attorney, Agent, or Firm* — Neal J. McLaughlin; Alston & Bird LLP

(57) ABSTRACT

Functional modules of a modular system include two or more ferrous conductors, each conductor having a separate magnet associated therewith that is electrically isolated from other conductors and magnets. Circuitry within functional modules is electrically connected to the ferrous conductors. The ferrous conductors of the functional modules are configured to be magnetically attracted to, contact, and receive power from ferrous conductors of a power delivery module.

9 Claims, 34 Drawing Sheets

(56) References Cited

U.S. PATENT DOCUMENTS

| | | | |
|---|---|---|---|
| 2012/0224375 A1* | 9/2012 | Zaderej | F21S 4/00 |
| | | | 362/249.02 |
| 2012/0282786 A1 | 11/2012 | Neel | |
| 2013/0044501 A1* | 2/2013 | Rudisill | F21V 21/35 |
| | | | 362/398 |
| 2015/0171564 A1 | 6/2015 | Hsu et al. | |
| 2016/0268728 A1 | 9/2016 | Zantout et al. | |
| 2019/0103702 A1 | 4/2019 | Chan et al. | |

OTHER PUBLICATIONS

International Search Report and Written Opinion for Application No. PCT/US2020/056803 dated Feb. 10, 2021.

* cited by examiner

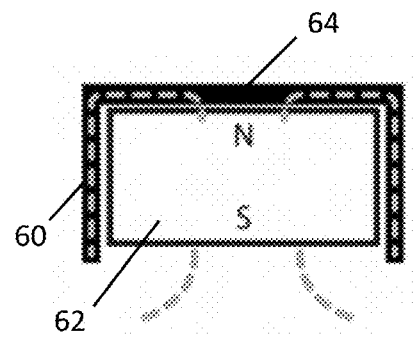
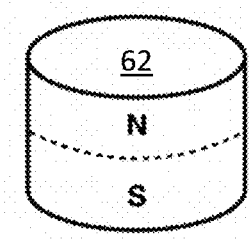
Fig. 16a    Fig. 16b
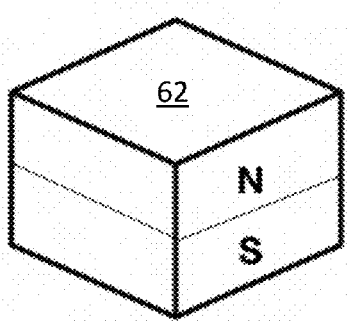
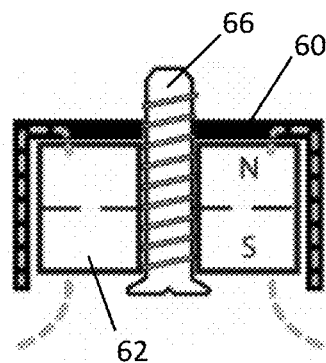
Fig. 16c    Fig. 16d
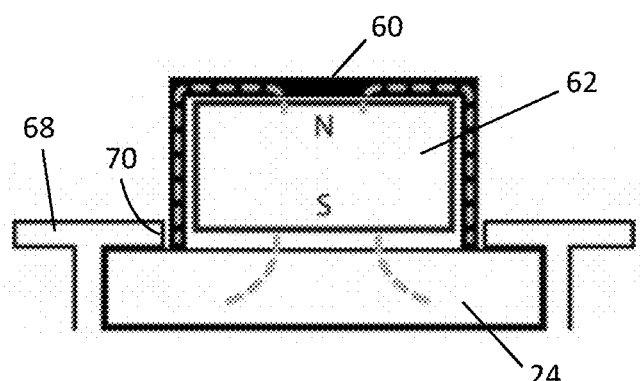
Fig. 16e

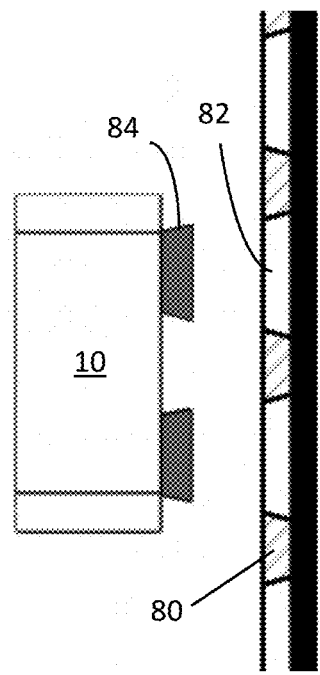 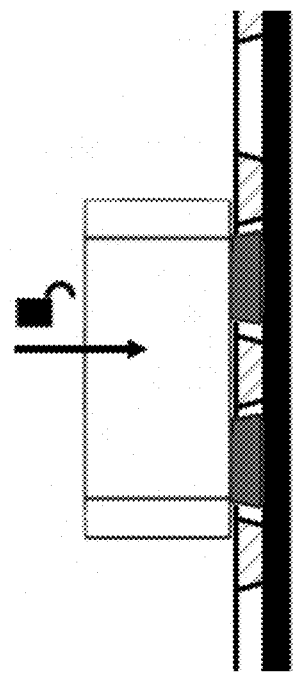 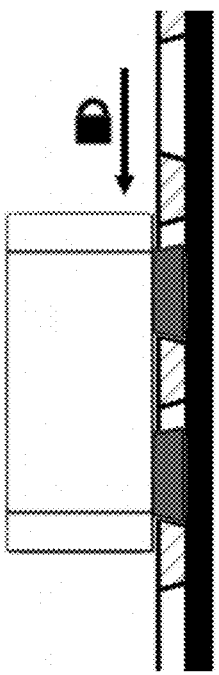
Fig. 26a    Fig. 26b    Fig. 26c
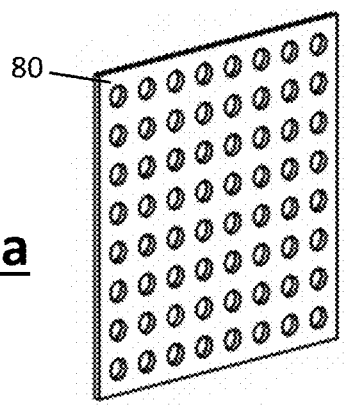 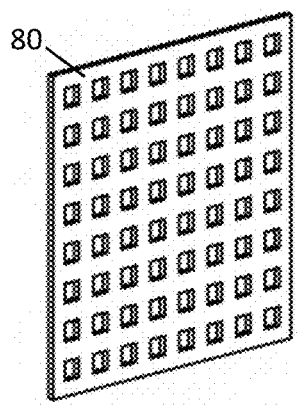
Fig. 27a    Fig. 27b
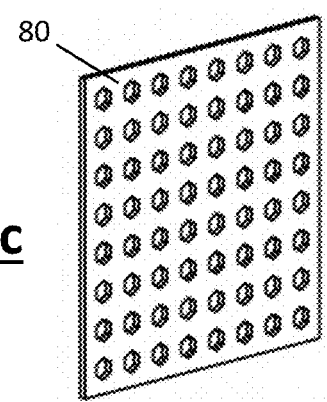 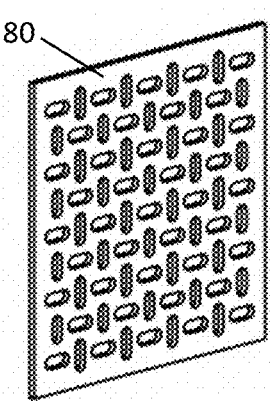
Fig. 27c    Fig. 27d

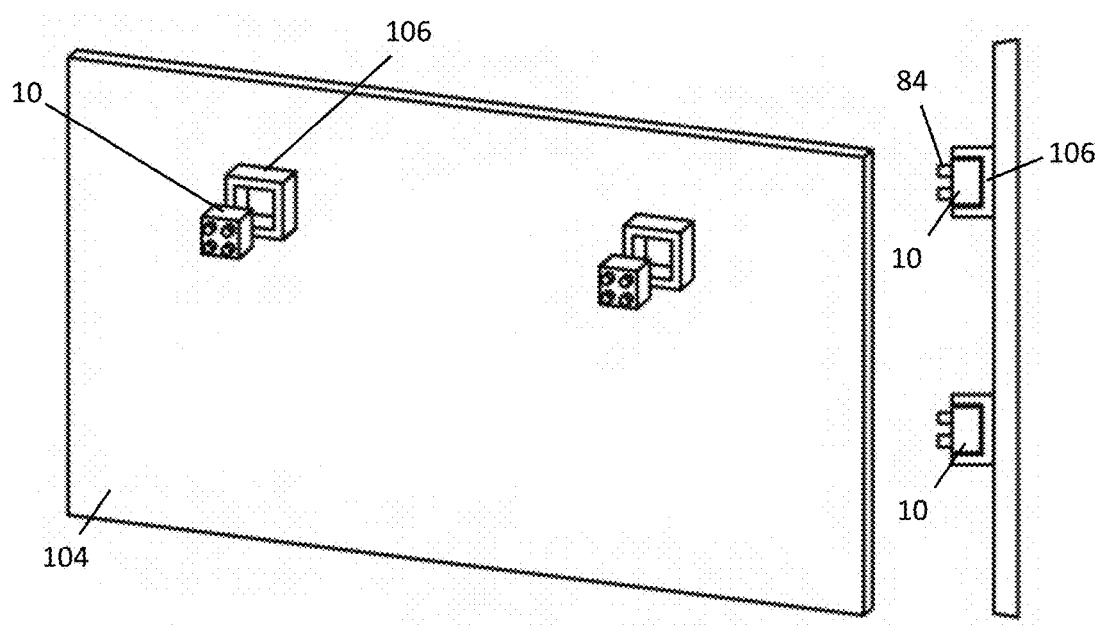
Fig. 37a  Fig. 37b
VV
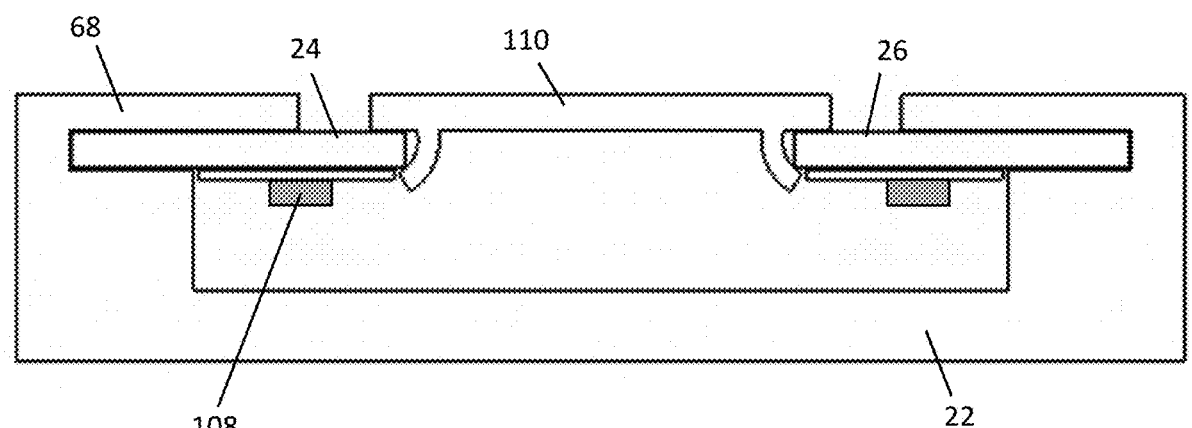
Fig. 38

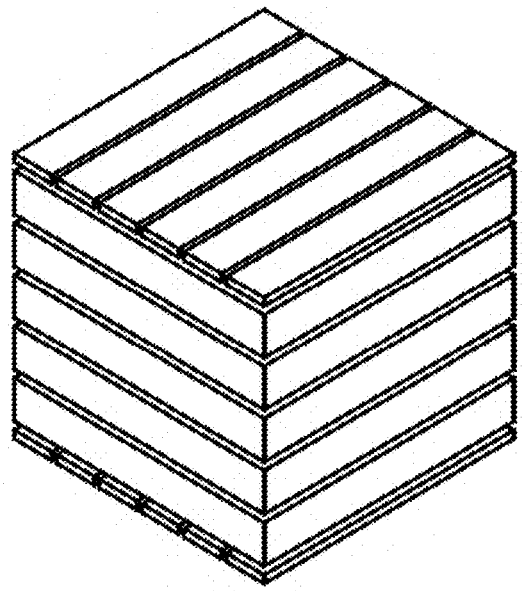
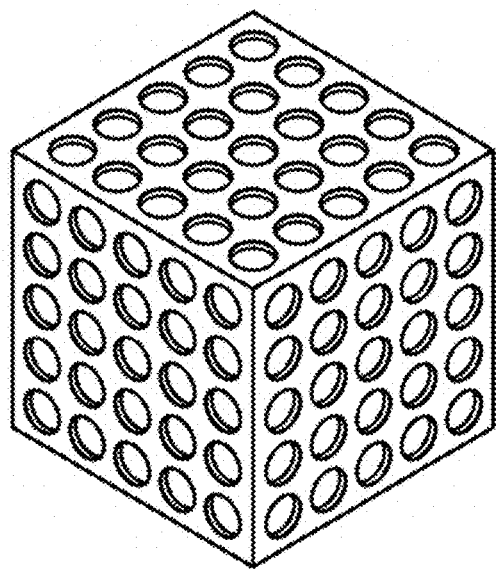
Fig. 40a　　　　　　　　Fig. 40b
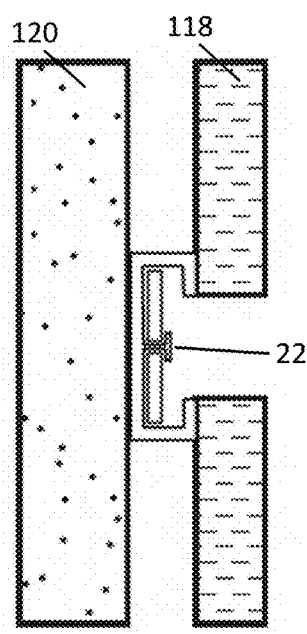
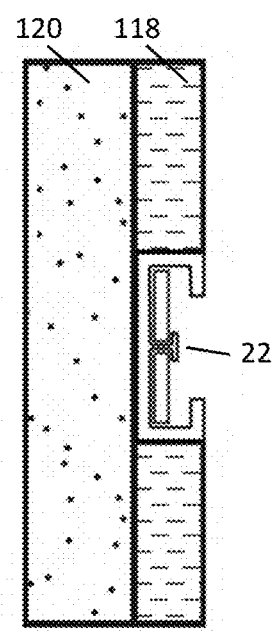
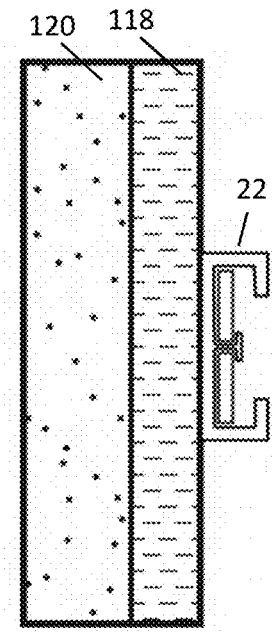
Fig. 41a　　　　　　　　Fig. 41b　　　　　　　　Fig. 41c

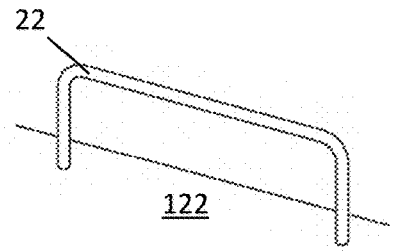
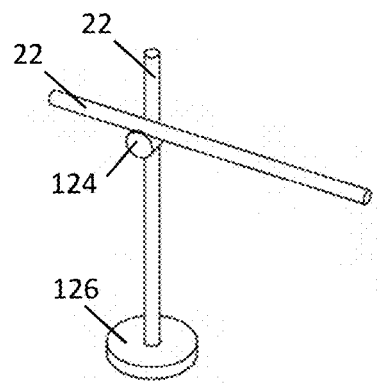
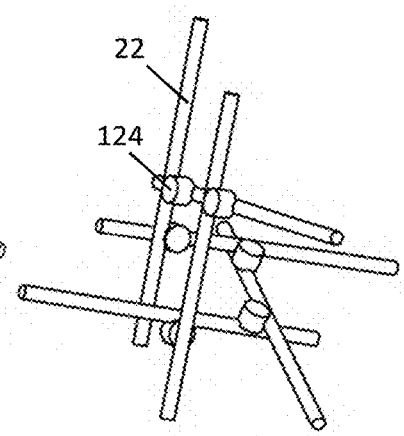
Fig. 43a  Fig. 43b  Fig. 43c
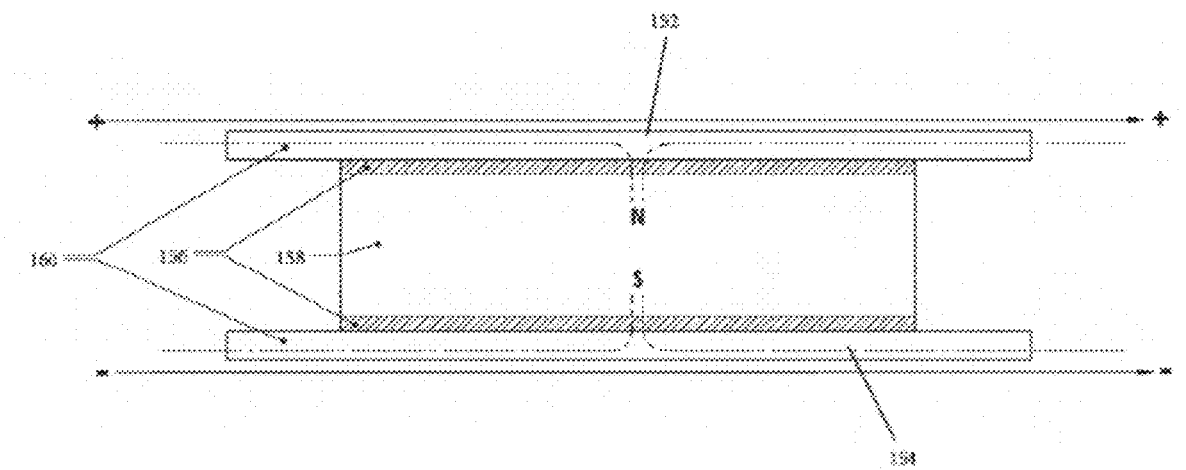
Fig. 44

ModULAR ELECTRO-MAGNETIC CONNECTIONS AND APPLICATIONS THEREOF

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

CROSS REFERENCE TO RELATED APPLICATIONS

This application is related to PCT International Application No. PCT/US2017/020977, filed Mar. 6, 2017, which claims the benefit of U.S. Provisional Application No. 62/303,927, filed Mar. 4, 2016, U.S. Provisional Application No. 62/303,943, filed Mar. 4, 2016, and U.S. Provisional Application No. 62/397,629, filed Sep. 21, 2016, each of which is hereby incorporated by reference in its entirety.

BACKGROUND

Current electrical power supply systems are often difficult to install and are non-extendible. For example, installation of a typical power outlet only provides a limited number of ports and often requires construction to access the interior of the wall to access the electrical wiring. Further, such electrical power outlets are not extendible without more construction or without using bulky and unsightly power extension cords.

Modular electrical systems, such as track lighting systems, allow electricity to be provided along an interior track. However, these electrical modular systems often require expensive installation and are difficult to modify on once installed. Further, track lighting systems only allow one degree of freedom of placement and movement (i.e., along the track) and the system is not designed to be used with other functional modules, such as extenders or wireless devices. It is an aim of the present invention to address the drawbacks of typical electrical and modular power supply systems.

In addition, modular electrical systems like track lighting systems typically operate at line voltages, making them unsafe for use in close proximity to humans or animals, for example on a desktop. Also, many modular electrical systems are bulky and unsightly, often due to their operation at line voltage and the corresponding need for increased conductivity and electrical resistance of the structures used to carry and isolate power, respectively. An additional source of bulk and frustration is that many current modular power systems include features that force a connection between components to occur in only one orientation so as to maintain a strict electric polarity mapping among conductors and modules.

It is the objective of the inventions described herein to provide effective solution to these and other problems in the existing options for providing modular electric connections.

SUMMARY

The subject of this specification relates to a modular electrical power supply system that allows power delivery and functional modules to be easily installed and rearranged. In particular, the present inventions involve magnetic and ferrous components in the connections to facilitate physical and electrical connections between modules.

In one aspect, a functional module comprises at least a first and second ferrous conductor at least partially exposed to an exterior of the functional module, a first magnet contacting the first ferrous conductor, a second magnet contacting the second ferrous conductor and electrically isolated from the first magnet and the first conductor; and circuitry electrically connected to the first and second ferrous conductors.

In some implementations, the first and second ferrous conductors are configured to channel and focus magnetic flux from the first and second magnets, respectively, thereby increasing a strength of magnetic flux at the exposed portions of the ferrous conductors to a level greater than would be present there with the magnets alone, while at the same time the first and second ferrous conductors are configured to electrically conduct at least one of power and data to the circuitry.

In one example, the first and second ferrous conductors are linear in shape, exposed portions thereof are arrayed in parallel and each of the first and second ferrous conductors include a chamfer on an edge thereof nearer to the other of the first and second ferrous conductors.

In another example, the functional module further comprises a third ferrous conductor at least partially exposed to an exterior of the functional module and a third magnet adjacent the third ferrous conductor, the third magnet being electrically isolated from the first and second magnets and also the first and second ferrous conductors.

In another example, the first and second ferrous conductors are projections both projecting from the functional module in the same direction.

In another example, the functional module further comprises a polarity reversing module between the first and second ferrous conductors and the circuitry, the polarity reversing module configured to provide consistent polarity power to the circuitry regardless of a polarity of power received by the functional module via the first and second ferrous conductors.

In another example, polarities of the first and second magnets are configured such that the first and second magnets tend to be forced apart as a result of their respective magnetic fields and the first ferrous conductor is configured to move with the first magnet towards the second magnet and second ferrous conductor in response to an externally applied force.

In another example, a magnetic attraction between the first ferrous conductor and a ferrous conductor of a power delivery module in proximity thereto causes the first ferrous conductor and the adjacent first magnet to move within the functional module.

In another example, at least one of the first ferrous conductor and the second ferrous conductor is configured to conduct data to the circuitry.

In another example, at least one of the first ferrous conductor and the second ferrous conductor is electroplated with an electrically conductive material.

In another aspect, a modular system comprises a functional module comprising at least a first and second ferrous conductor at least partially exposed to an exterior of the functional module, a first magnet contacting the first ferrous conductor, a second magnet contacting the second ferrous conductor and electrically isolated from the first magnet and the first conductor, and circuitry electrically connected to the first and second ferrous conductors; and a power delivery module comprising first and second ferrous power delivery conductors and a power supply electrically connected to the first and second ferrous power delivery conductors, wherein the first and second ferrous conductors of the functional module are configured to be magnetically attracted to, contact, and receive power from the first and second ferrous power delivery conductors, respectively.

In some implementations, the first and second ferrous conductors are configured to channel and focus magnetic flux from the first and second magnets, respectively, thereby increasing a strength of magnetic flux at the exposed portions of the ferrous conductors to a level greater than would be present there with the magnets alone, while at the same time the first and second ferrous conductors are configured to electrically conduct power to the circuitry.

In one example, the functional module further comprises a third ferrous conductor at least partially exposed to an exterior of the functional module and a third magnet adjacent the third ferrous conductor, the third magnet being electrically isolated from the first and second magnets and also the first and second ferrous conductors.

In another example, the third ferrous conductor of the functional module is configured to communicate data with the circuitry and the power delivery module includes a ferrous data conductor configured to be magnetically attracted to, contact, and communicate data with the third ferrous conductor of the functional module.

In another example, the modular system further comprises a second functional module comprising at least a first and second ferrous conductor at least partially exposed to an exterior of the functional module, a first magnet contacting the first ferrous conductor, a second magnet contacting the second ferrous conductor and electrically isolated from the first magnet and the first conductor, and circuitry electrically connected to the first and second ferrous conductors, wherein the first and second ferrous conductors are configured to channel and focus magnetic flux from the first and second magnets, respectively, thereby increasing a strength of magnetic flux at the exposed portions of the ferrous conductors to a level greater than would be present there with the magnets alone, while at the same time the first and second ferrous conductors are configured to electrically conduct power to the circuitry, the power delivery module includes more ferrous power delivery conductors than either the functional module or the second functional module has ferrous conductors, and the circuitry of the functional module and the circuitry of the second functional module are operational at least when the ferrous conductors of the functional module contact a set of ferrous power delivery conductors that is not identical to a set of ferrous power delivery conductors contacted by the ferrous conductors of the second functional module.

In another example, the first and second ferrous power delivery conductors are elongate in shape and arrayed in parallel to one another along their longest dimension.

In another example, the first and second ferrous power delivery conductors are curved in three dimensions.

In another example, the power delivery module comprises a third ferrous power delivery conductor and includes more ferrous power delivery conductors than the functional module has ferrous conductors.

In another example, the modular system further comprises a second power delivery module comprising first and second ferrous power delivery conductors, the first and second ferrous power delivery conductors of the power delivery module and the second power delivery module, respectively, being electrically connected to one another, wherein the first and second ferrous conductors of the functional module are configured to be magnetically attracted to, contact, and receive power from the first and second ferrous power delivery conductors, respectively, of either the power delivery module or the second power delivery module.

In another example, the first ferrous conductor of the functional module is configured to be magnetically attracted to, contact, and receive power from either the first ferrous power delivery conductor or the second power delivery conductor, the second ferrous conductor of the functional module being magnetically attracted to, contacting, and receiving power from the other of the first ferrous power delivery conductor and the second power delivery conductor.

In another example, the circuitry is configured to have a first function if the first ferrous conductor of the functional module receives power from the first ferrous power delivery conductor and a second function if the first ferrous conductor of the functional module received power from the second power delivery conductor.

In another example, the power delivery module includes more ferrous power delivery conductors than the functional module has ferrous conductors, the first and second ferrous power delivery conductors are elongate in shape and arrayed in parallel to one another along their longest dimension, and the power supply is connected to the arrayed ferrous power delivery conductors with alternating power polarities.

In another example, the first and second ferrous conductors of the functional module are projections that project from an outer surface of the functional module and the power delivery module includes a cover having discrete openings therein each configured to receive only one functional module projection, thereby defining discrete attachment positions between the functional module and the power delivery module.

In another example, the openings in the cover of the power delivery module expose ferrous power delivery conductors in a checkerboard-type array of power polarities.

In another example, the first and second ferrous power delivery conductors are each exposed to an exterior of the power delivery module through at least two discrete openings in the cover of the power delivery module.

BRIEF DESCRIPTION OF THE DRAWINGS

FIGS. 16a and 16d are cross section views of conductor projections of functional modules according to exemplary embodiments.

FIGS. 16b and 16c are perspective views of magnets for use within conductor projections of functional modules according to exemplary embodiments.

FIG. 16e is a cross section view of a conductor projection engaging with a power delivery module according to an exemplary embodiment.

FIGS. 26a-26c are cross section views of a functional module engaging with a power delivery module according to an exemplary embodiment.

FIGS. 27a-27d are perspective views of various power delivery module covers according to exemplary embodiments.

FIG. 28b is a cross section view of the power delivery module conductor array shown in FIG. 28a.

FIG. 28c is a partial perspective view of the power delivery module conductor array shown in FIG. 28a.

FIG. 37a is a perspective view of functional modules engaging with an object according to an exemplary embodiment.

FIG. 37b is a side view of the functional modules engaged with an object according to the embodiment shown in FIG. 37a.

FIG. 38 is a cross section view of a power delivery module according to an exemplary embodiment.

FIGS. 40a and 40b are perspective views of three-dimensional power delivery module conductor arrays according to exemplary embodiments.

FIGS. 41a, 41b and 41c are cross sectional views of recessed, flush and surface mounting options of power delivery modules according to exemplary embodiments.

FIGS. 43a, 43b and 43c are perspective views of rod-shaped power delivery module configurations according to exemplary embodiments.

FIG. 44 shows a cross section view of a modular electromagnetic connection component.

DETAILED DESCRIPTION

Embodiments of modular electro-magnetic connections, applications thereof and methods for their installation are described herein. While aspects of the described connections can be implemented in any number of different configurations, the embodiments are described in the context of the following exemplary configurations. The descriptions and details of well-known components and structures are omitted for simplicity of the description.

The description and figures merely illustrate exemplary embodiments of the inventive connections and applications thereof. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventors to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof. Various embodiments described herein provide an overview of the present inventions' key features. However, the designs' features are not limited to the examples and figures provided herein for illustration purposes.

In general, the present disclosure provides various arrangements of metallic and magnetic components the serve to both provide for conduction of electrical power between modules as well as a physical attraction between modules to assist with alignment, holding the modules together, etc.

Figure 1:
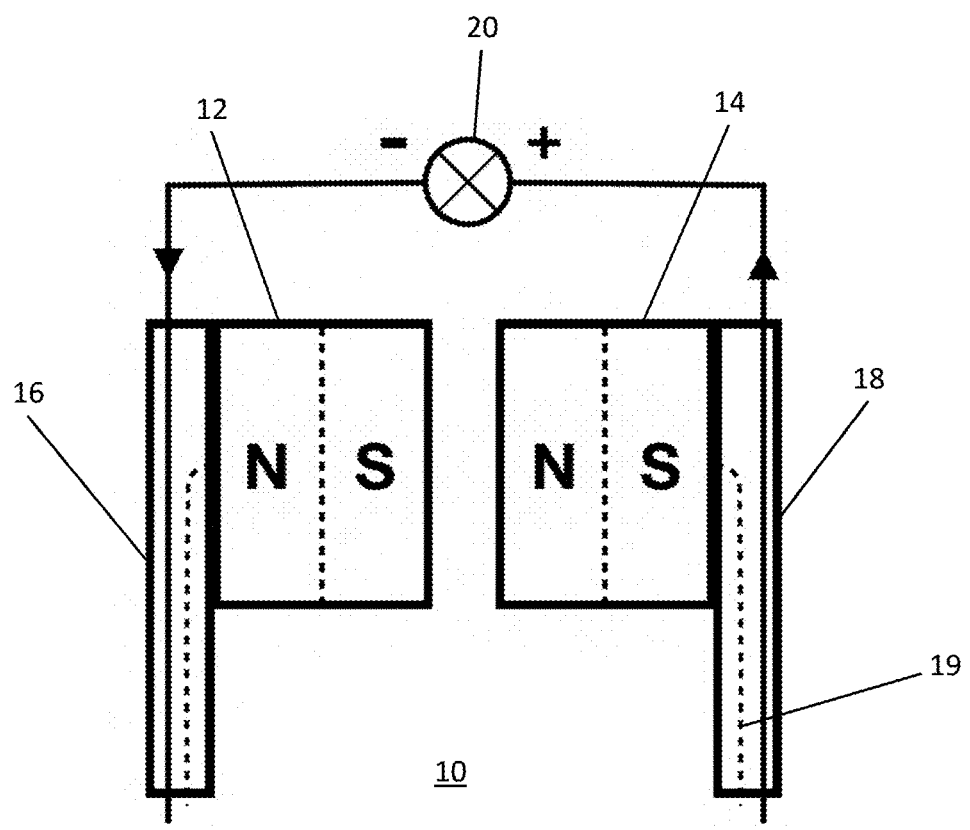
FIG. 1 shows a cross section view of a functional module according to an exemplary embodiment.

In an exemplary approach, shown generally in FIG. 1, a functional module 10 includes circuitry 20 that is electrically connected to one or more electromagnetic conductor assemblies each comprising a magnet (each with north and south magnetic poles, N and S, respectively) in contact with a ferrous conductor. The ferrous conductors serve to channel and focus magnetic flux from the magnets, increasing the strength of the magnetic flux 19 at the exposed ends of the ferrous conductors to a level greater than is present with the magnets alone. The focused magnetic flux 19 increases attachment strength to ferrous conductors of a power delivery module. In another function, performed at the same time as the magnetic flux 19 is being focused, the ferrous conductors also conduct electric power or signals to the circuitry from ferrous conductors of power delivery modules. In the example shown in FIG. 1, the functional module 10 includes two electromagnetic conductor assemblies, the first comprising magnet 12 and ferrous conductor 16 and the second comprising magnet 14 and ferrous conductor 18. The electromagnetic conductor assemblies are electrically isolated from one another by, for example, an air gap, a non-electrically conductive material, etc.

Figure 2:
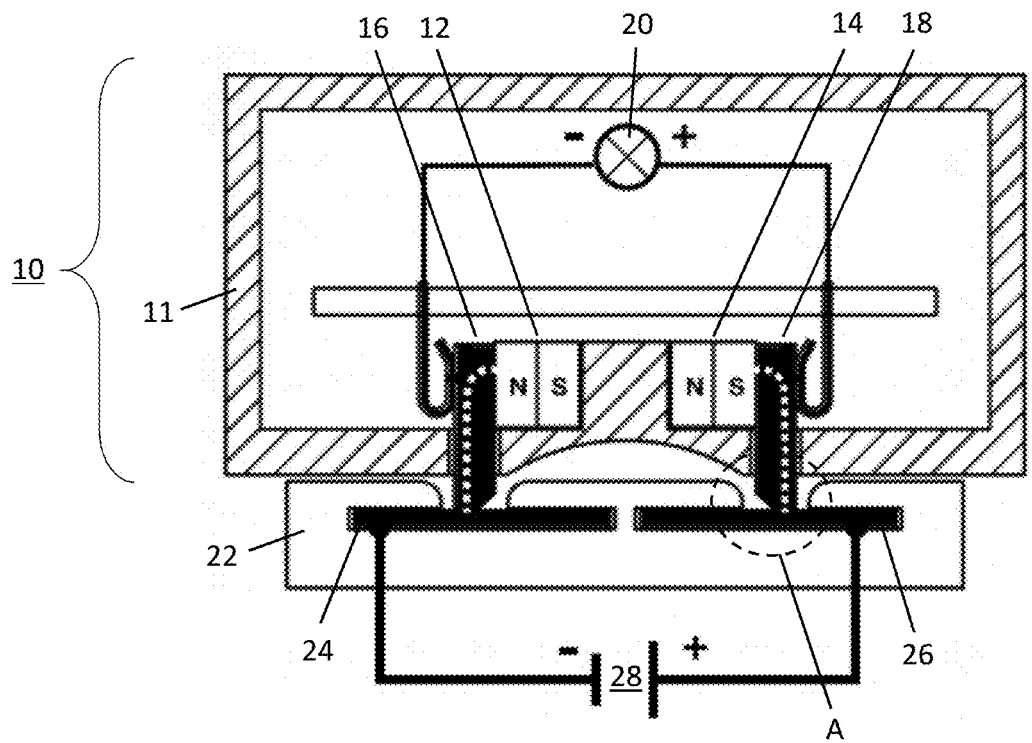
FIG. 2 shows a cross section view of a functional module and power delivery module according to an exemplary embodiment.

FIG. 2 shows an example of a functional module 10 that includes an optional housing 11. As shown in FIG. 2, the housing 11 may be not electrically conductive and a portion thereof may be configured to separate the magnets 12 and 14. Circuitry 20 receives power conducted through ferrous conductors 16 and 18 from a power delivery module 22. Power delivery module 22 includes ferrous conductors 24 and 26 which are configured to conduct power from power supply 28 and also be magnetically attracted to the ferrous conductors of the functional module. Any of the ferrous conductors of the functional module 10 or of the power delivery module 22 may be coated with an electrically conducting material to improve, for example, electrical conductivity, wear resistance, environmental stability (e.g., resistance to rust and/or oxidation), appearance, etc. For example, one or more of the ferrous conducting elements may be electroplated.

In another approach, shown generally in FIG. 44, a single magnet 158 with north and south magnetic poles (N and S, respectively) is electrically isolated from ferrous conductors 152 and 154 by insulators 156. A power supply 160 provides positive and negative polarity power to the conducting elements 152 and 154, respectively. Accordingly, this arrangement provides power to a mating module having ferrous conductors arranged to contact conductors 152 and 154, while at the same time being magnetically attracted thereto.

In either approach, power is conducted through ferrous conductors rather than through one or more magnets. The ferrous conductors are generally better electrical conductors, with less electrical resistance than the one or more magnets. In addition, if electrical power were to pass through the one or more magnets, the magnet(s) may be subjected to mechanical and/or thermal stress, potentially raising operating temperatures and/or degrading magnetic properties of the magnet(s).

FIG. 2 depicts the provided power as being polarized (for example, DC power), the present inventions are also compatible with non-polarized power applications (for example, AC power) and data transmission applications in which no appreciable power is conducted. In a data transmission application, circuitry 20 might be a data transceiver configured to transmit and receive data over conductors 16 and 18, through conductors 24 and 26, respectively, and ultimately to another data transceiver in place of power supply 28. Of course, the present inventions are not limited to applications with two conductors—any number of conductors may be employed according to the needs of the application.

Figure 3:
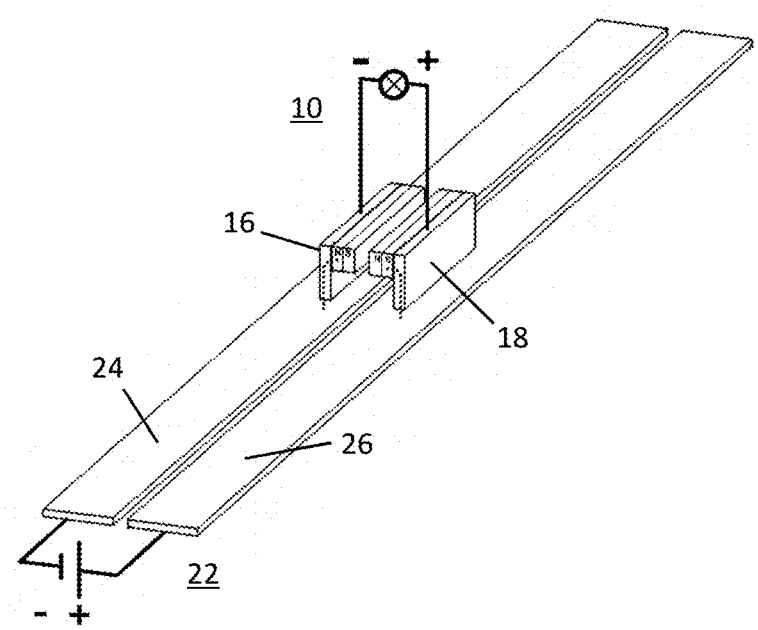
FIG. 3 shows a partial perspective view of a functional module and power delivery module according to an exemplary embodiment.

As shown in FIG. 3, conductors 24 and 26 may be formed in an elongate fashion, allowing functional module 10 to connect thereto and receive power at any point along their length. In addition, because the power delivery module and functional module are not rigidly connected, but rather held together through magnetic attraction, functional module may be slid along the conductors 24 and 26 of the power delivery module in a dynamic fashion without interruption of the electrical connection between the modules.

Figure 4:
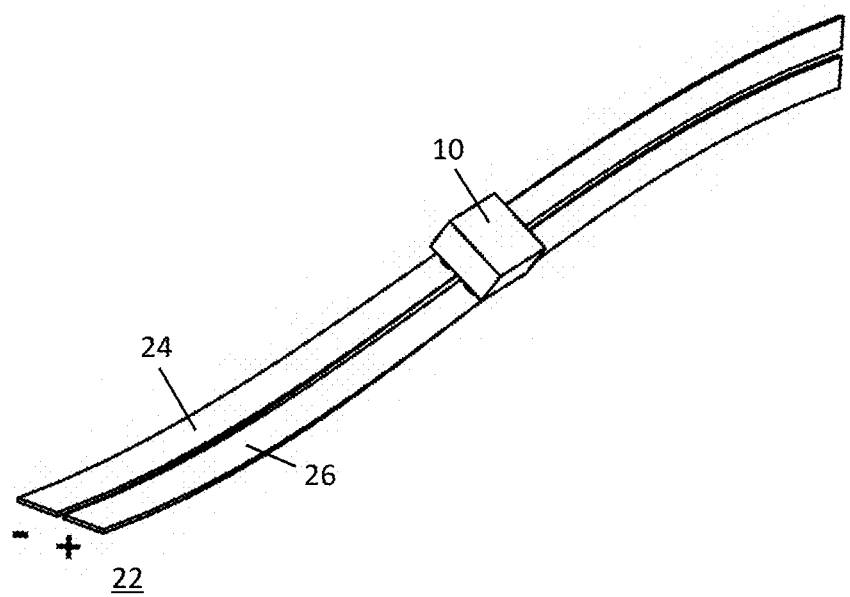
FIG. 4 shows an example of a power delivery module that is curved in three dimensions according to an exemplary embodiment.
Figure 5:
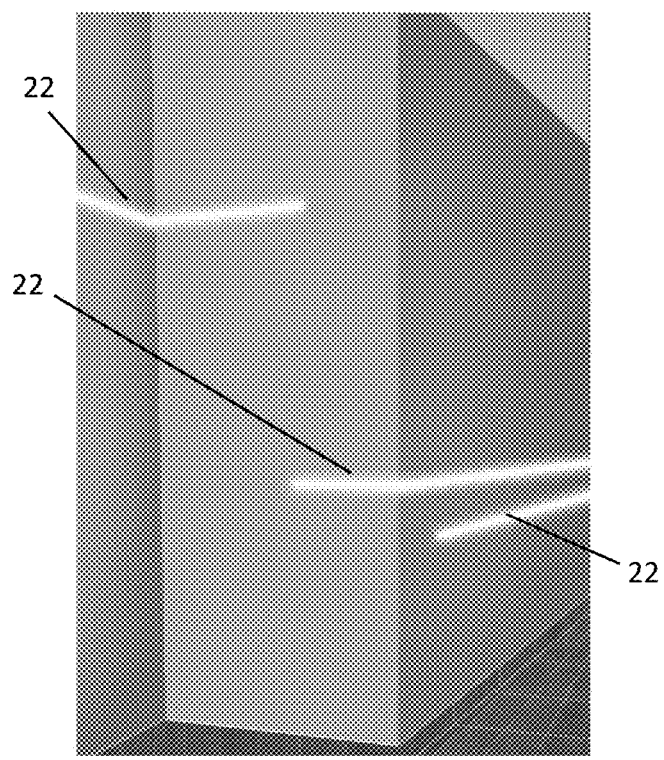
FIG. 5 shows an example of a power delivery module that is angled or bent to accommodate inside and outside corners of a wall according to an exemplary embodiment.
Figure 6:
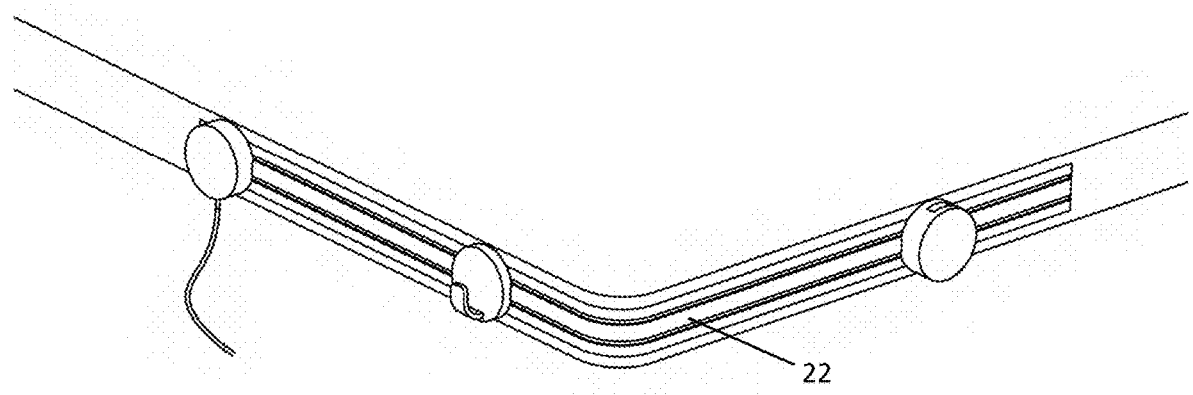
FIG. 6 shows an example of a power delivery module that includes a bend according to an exemplary embodiment.
Figure 7:
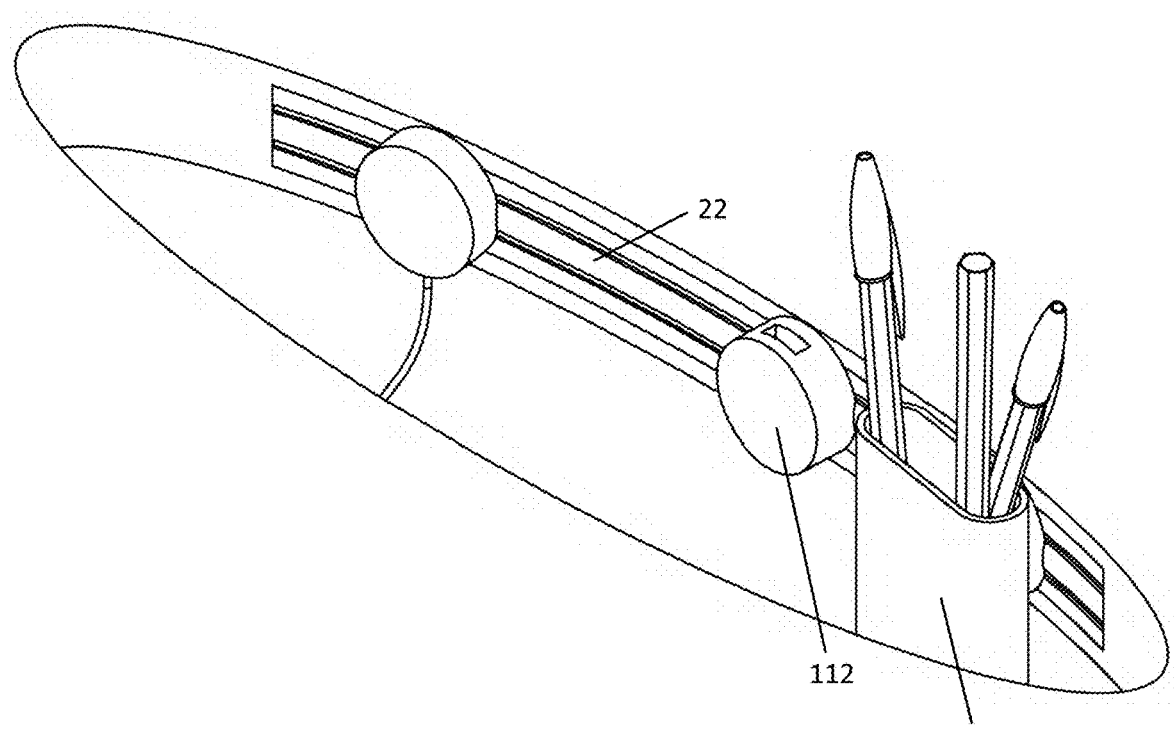
FIG. 7 shows an example of a power delivery module that is curved and is formed along the sidewall of an interior hole in a countertop or desk surface according to an exemplary embodiment.

As shown in FIG. 4, the power delivery module 22 and the conductors 24 and 26 therein need not be straight or linear; they may be bent or shaped in any three dimensional direction(s). For example, as shown in FIG. 4, the conductors 24 and 26 (and the power delivery module 22 comprising them) may be helically or corkscrew shaped. They may also be angled or bent to follow the contours of walls and corners thereof, as shown in FIG. 5, depicting an embodiment with a light source embedded in the power delivery modules 22. FIG. 6 shows another embodiment in which a power delivery module 22 includes a bend. FIG. 7 shows yet another embodiment in which a power delivery module 22 is curved and is formed along the sidewall of an interior hole in a countertop or desk surface.

In settings where a power delivery module 22 is configured to be attached to a solid surface such as a wall or ceiling of a building, the module may be attached or integrated in one of several ways. For example, as shown in FIG. 41a, a power delivery module 22 may be recessed beneath a panel 118 and mounted on a substrate 120. In another example, as shown in FIG. 41b, a power delivery module 22 may be mounted on a substrate 120 such that it is flush with the user facing side of a panel 118. In another example, as shown in FIG. 41c, a power delivery module 22 may be surface mounted on a side of a panel 118.

Figure 8:
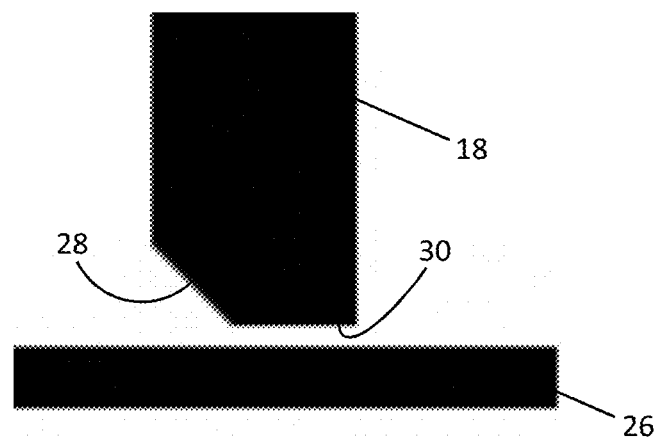
FIG. 8 is a zoomed in view of conductors 18 and 26 in area A in FIG. 2.

In one embodiment, functional module conductors 16 and 18 include a chamfer 28 along an inner edge thereof, as shown in FIG. 8, which is a zoomed in view of conductors 18 and 26 in area A of FIG. 2. In FIG. 8, the conductors are shown as separated slightly for the purpose of depicting the components' geometries, but in operation, the conductors would be touching, thus conducting electricity therethrough. Conductors 16 and 18 also include flat, substantially coplanar surfaces 30 which, in the configuration shown in FIGS. 2 and 8, contact conductors 24 and 26, respectively, which are also substantially coplanar in cross section. The chamfer 28, although depicted in FIG. 6 as a flat chamfer, with a linear cross section, may take any one of several forms including, for example, a concave or convex arc or two or more linear chamfers forming a concave or convex cross section. For example, a chamfer may be formed with a convex arc cross section sized to accommodate the cylindrical outer surface of conductors of a rod-shaped power delivery module.

Figure 9:
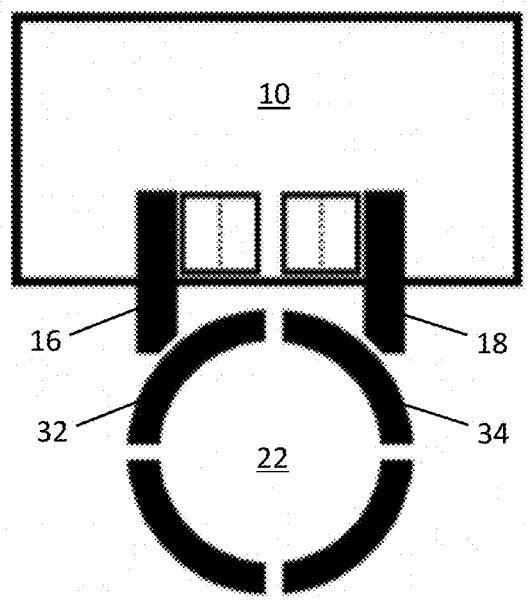
FIG. 9 is a cross section view depicting the engagement of a chamfer on module conductors with curved outer surfaces of ferrous conductors of a power delivery module according to an exemplary embodiment.
Figure 10:
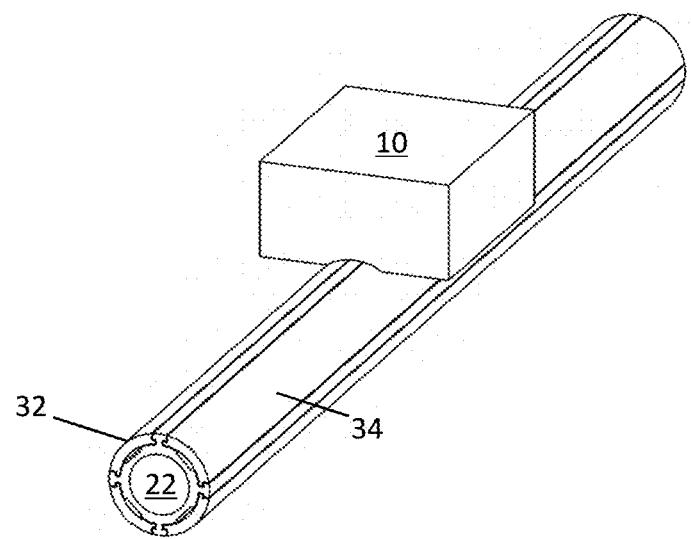
FIG. 10 shows a perspective view of the modules shown in cross section in FIG. 9.

The chamfer 28 may be configured to engage a power delivery module or other module having a non-coplanar orientation of conductors, such as, for example, a round module, a module with a triangular, diamond or other polygon profile, etc. For example, FIG. 9 depicts the engagement of a chamfer on module conductors 16 and 18 with the curved outer surfaces of ferrous conductors 32 and 34 of a power delivery module 22. FIG. 10 shows a perspective view of the modules 10 and 22 shown in cross section in FIG. 9.

Figure 11:
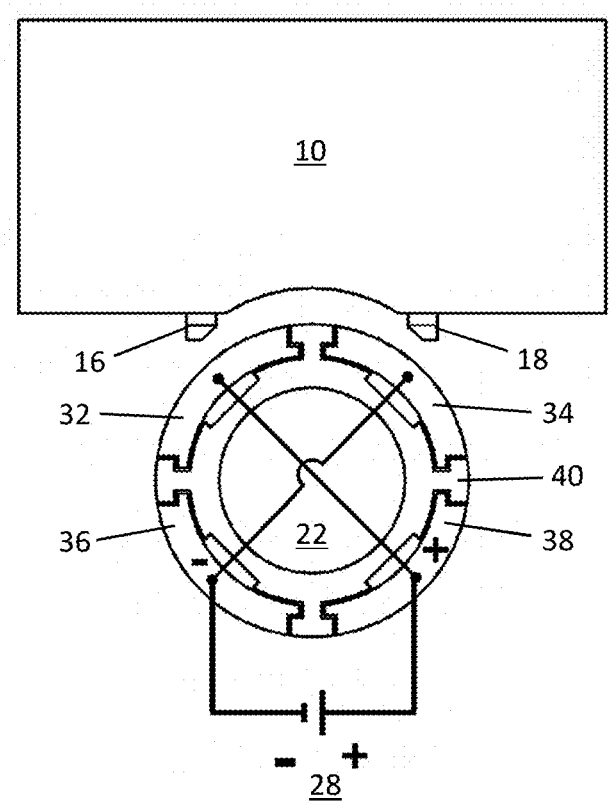
FIG. 11 is a cross section view of a functional module and a power delivery module with four conductors according to an exemplary embodiment.

In one embodiment, shown generally in FIG. 11, a power delivery module 22 includes four conductors 32, 34, 36 and 38. A module extrusion 40 (which may be formed of one or more subcomponents) provides structure to the module and also serves to electrically isolate and insulate the conductors. A power supply 28 provides power to the conductors such that conductors on opposite sides are electrically connected. For example, a positive lead of the power supply 28 may be connected to conductors 32 and 38 and a negative lead of the power supply 28 may be connected to conductors 34 and 36. In an embodiment including more than four conductors in a power delivery module, polarized power may be provided to the conductors such that every other conductor may be electrically connected to one another such that polarity among the conductors alternates around the perimeter of the power module. In a further example, multiple phase power may be provided via corresponding power delivery module conductors.

Figure 12:
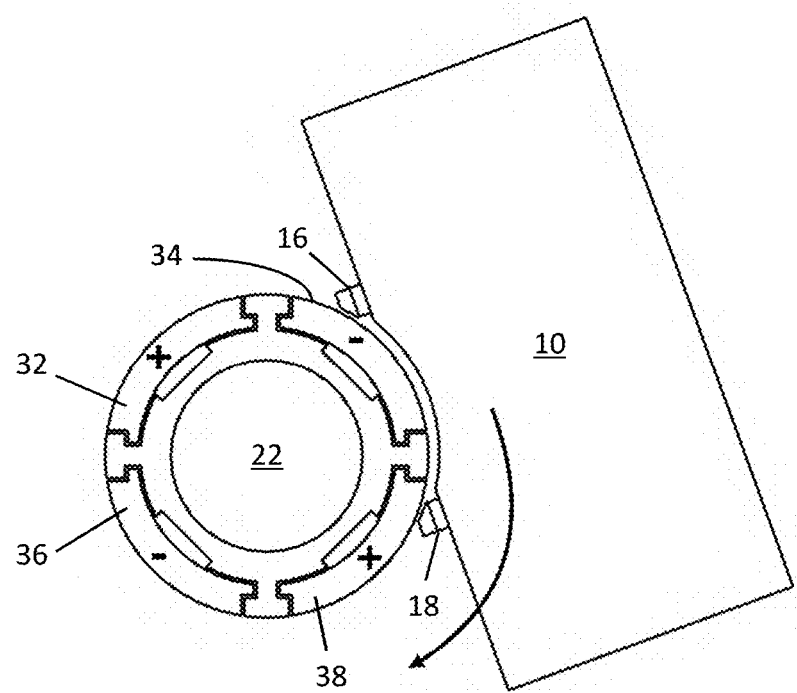
FIG. 12 is a cross section view of a functional module and a power delivery module with four power carrying conductors according to an exemplary embodiment.

As shown in FIG. 12, a functional module 10 may be configured to spin around a rod-shaped power delivery module 22. As it does so, the conductors 16 and 18 go from connecting with conductors 32 and 34, respectively, to conductors 34 and 36, respectively. Consequently, the polarity of power conducted through the functional module's conductors 16 and 18 is reversed.

Rod-shaped power delivery modules can take many forms. For example, as shown in FIG. 43a, a rod-shaped power delivery module 22 may be mounted on a surface 122 and may be curved in a "D" or arch shape. In another example, shown in FIG. 43b, two rod-shaped power delivery modules 22 may be connected to one another via a connection module 124 and may rest on a base 126 to form a lamp structure. In yet another example, shown in 43c, a plurality of rod-shaped power delivery modules 22 may be connected to one another via connection modules 124 to form a 3D free form structure that may be hanging or free-standing.

Figure 13:
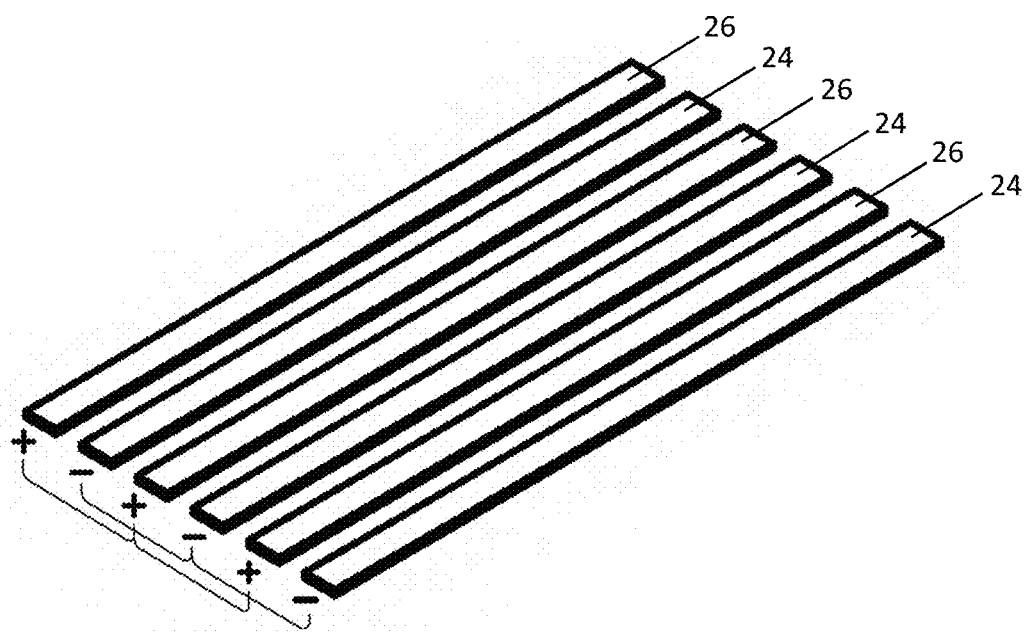
FIG. 13 shows an example of an array of conductors in a power delivery module according to an exemplary embodiment.

In another embodiment, shown generally in FIG. 13, a power delivery module with flat conductors may include an array of more than two conductors 24 and 26 of alternating polarity.

Figure 14A:
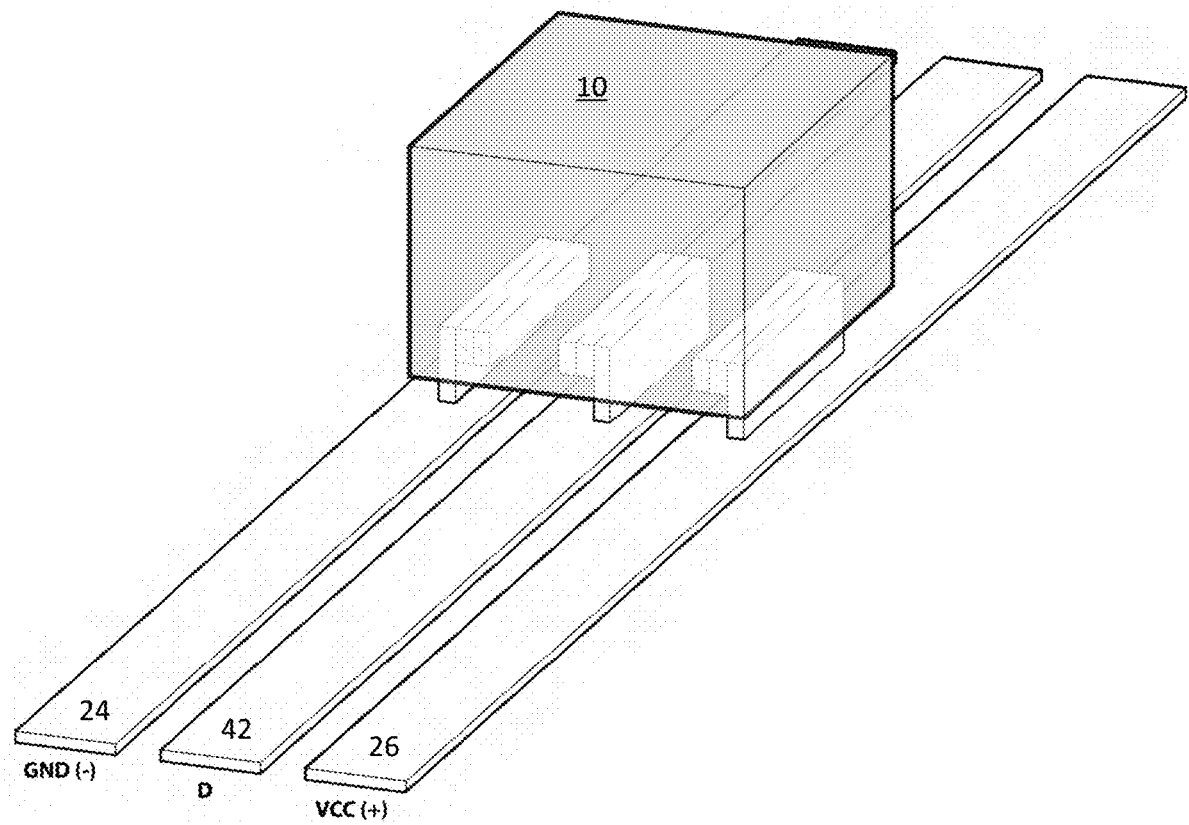
FIGS. 14a and 14b show an example of modules having three conductors according to an exemplary embodiment.
Figure 14B:
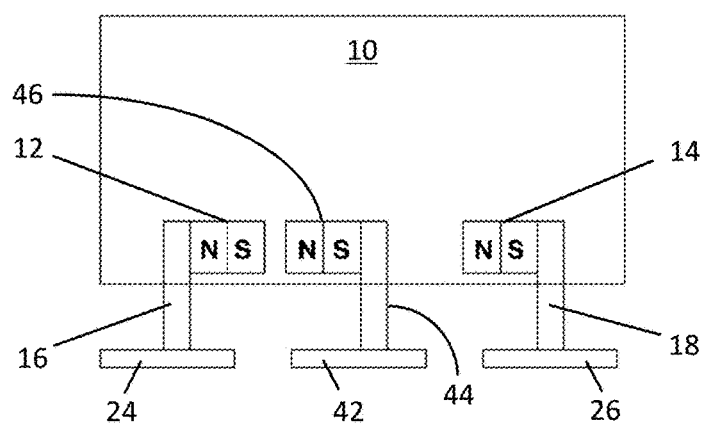

In another embodiment, shown generally in FIG. 14a, a power delivery module may include an array of three conductors 24, 26 and 42. Although depicted as flat conductors, they need not be. In the example shown, conductors 24 and 26 may be configured to provide power (e.g., ground (−) and VCC (+), respectively) as well as a conductor 42 devoted to data transmission. FIG. 14b shows a possible arrangement of magnets 12, 14 and 46 among conductors 16, 18 and 44, respectively, within the functional module 10 shown in FIG. 14a.

Figure 15A:
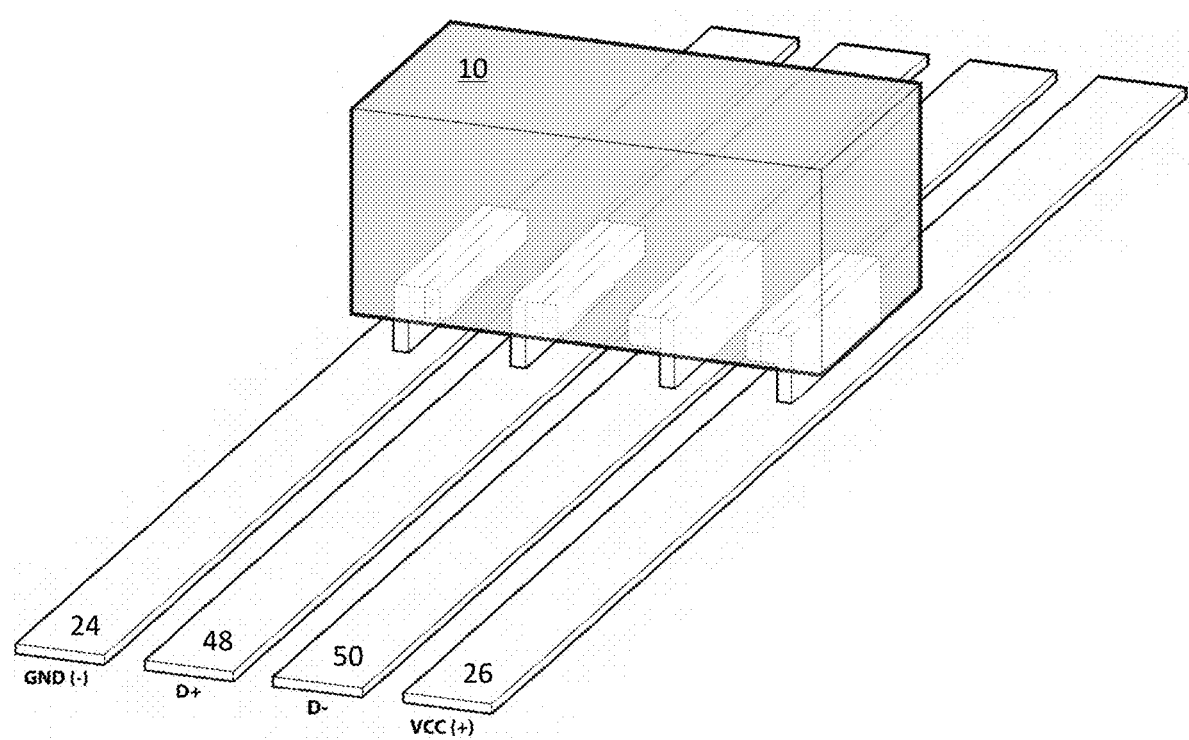
FIGS. 15a and 15b show an example of modules having four conductors according to an exemplary embodiment.
Figure 15B:
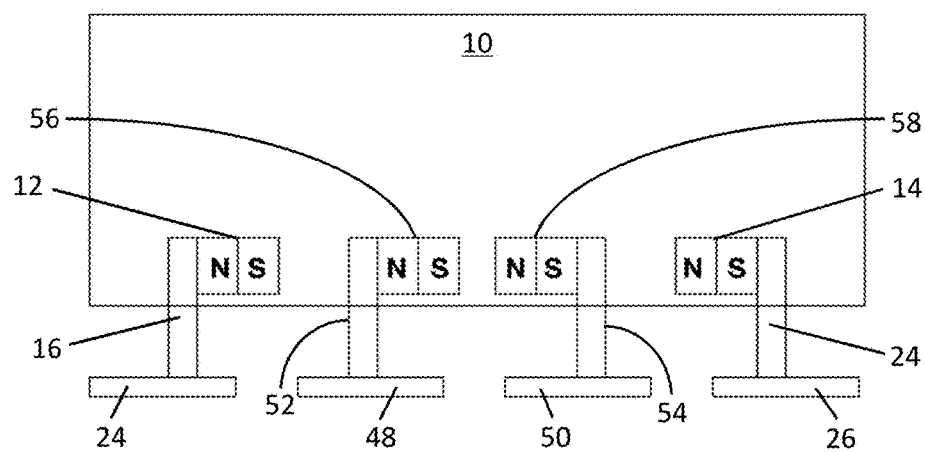

In another embodiment, shown generally in FIG. 15a, a power delivery module may include an array of four conductors 24, 26, 48 and 50. Although depicted as flat conductors, they need not be. In the example shown, conductors 24 and 26 may be configured to provide power (e.g., ground (−) and VCC (+), respectively) as well as two conductors 48 and 50 devoted to data transmission (e.g., D+ and D−, respectively). FIG. 14b shows a possible arrangement of magnets 12, 14, 56 and 58 among conductors 16, 18, 52 and 54, respectively, within the functional module 10 shown in FIG. 15a. In one example, the four conductors of the modules may be configured to operate in accordance with the USB protocol.

In the example shown in FIG. 3, functional module conductors 16 and 18 take the form of flat, blade-like conductors. In the example shown in FIG. 16a, a conductor of a functional module may take the form of a ferrous metal cover 60 over a magnet 62 protruding from a surface of the functional module. For example, a conductor projection may include a cylindrical magnet (as shown in FIG. 16b), a rectangular magnet (as shown in FIG. 16c) or a toroidal magnet with a center hole (as shown in FIG. 16d) encased by a ferrous metal cap. An end surface 64 of the cap may either be oriented towards the functional module or away from it. In addition, a magnet of a conductor projection may be fully encased by the ferrous cap. A conductor projection may be adhered to a functional module via an adhesive and/or may be mechanically fixed to the functional module, for example, by a screw 66 (as shown in FIG. 16d). As shown in FIG. 16e, a conductor projection may be attracted to (via magnetic attraction) and contact a power delivery module conductor 24 (to conduct electricity and/or data). The sides of the projection may be configured to fit within openings 70 in an insulative body 68 of a power delivery module, as shown in FIG. 16e. The openings 70 may be configured to align the projection in one position or may be configured to permit movement of the projection along the power delivery module conductor 24.

Figure 17A:
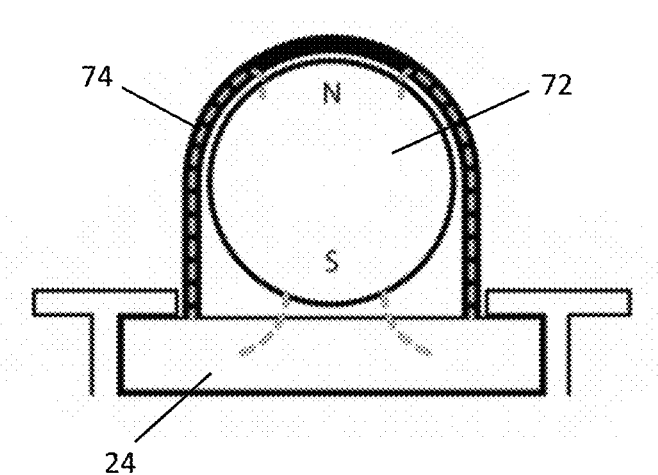
FIG. 17a is a cross section view of a conductor projection engaging with a power delivery module according to an exemplary embodiment.
Figure 17B:
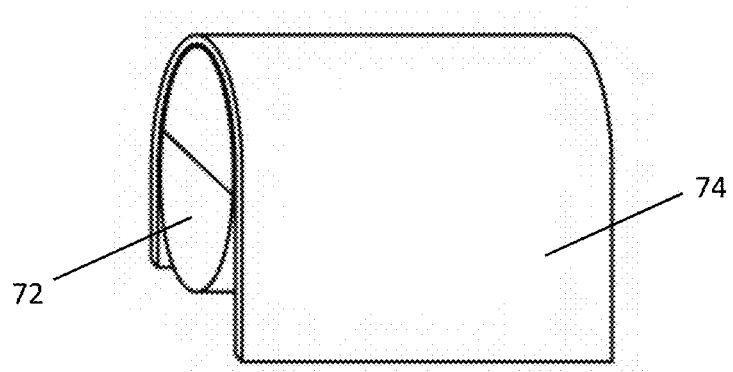
FIG. 17b is a perspective view of a conductor projection according to an exemplary embodiment.

In another example, shown in FIGS. 17a and 17b, a projection of a functional module may include a cylindrical magnet 72 oriented with its axis generally parallel to a surface of a mating power delivery module conductor 24. The cylindrical projection may be wrapped with a ferrous cap 74 along its circumference and optionally also about its circular ends. The polarity of the magnet 72 may be as shown in FIG. 17a or may be rotated + or −90 degrees such that an imaginary line connecting the north and south poles is generally parallel with a surface of conductor 24.

Generally, functional modules may be provided with at least one conductor for each conductor of a power delivery module that needs to be contacted to ensure proper function of the functional module and its circuitry. For example, if a functional module needs two conductors to receive power for circuitry comprising a light, the functional module will include at least two conductors or conductor projections. However, functional modules may be configured with more than the minimum number of conductors (which may take the form of conductor projections). Such extra conductors may be configured to provide redundant connections to power delivery module conductors (two or more functional module conductors contact the same power delivery module conductor) and/or extra functional module conductors may be configured to contact power delivery module conductors not necessary for function of the functional module's circuitry. For example, the functional module 10 of FIGS. 14*a* and 14*b* may be a simple light that only needs a connection to power delivery conductors 26 and 26. The conductor 44 may have no electrical purpose with respect to the light, yet may be included in the functional module anyway, for example to provide increased magnetic attraction, for cosmetics, to provide future circuitry upgrade potential, etc.

Figure 18A:
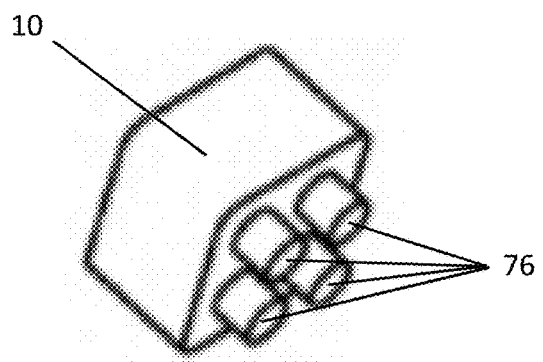
FIG. 18a is a perspective view of a functional module according to an exemplary embodiment.
Figure 18B:
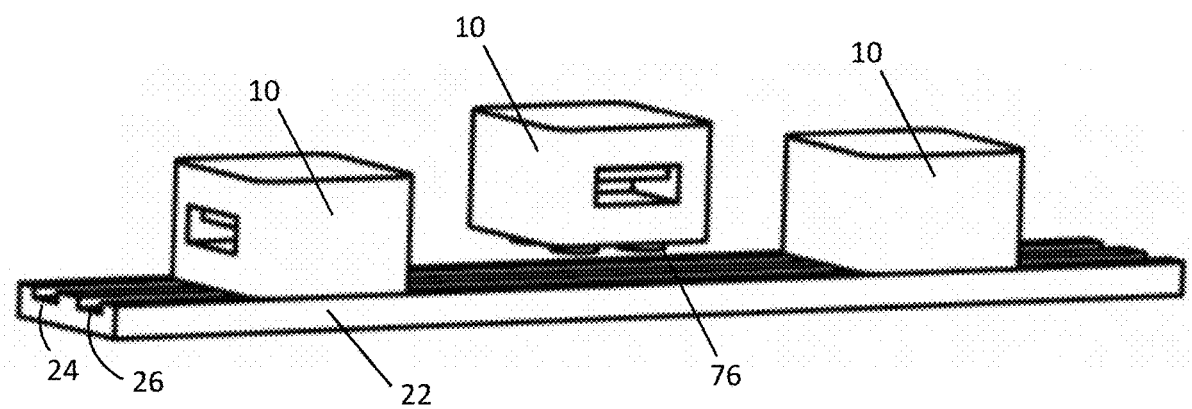
FIG. 18b is a perspective view of functional modules engaging with a power delivery module according to an exemplary embodiment.

In one example, shown in FIG. 18*a*, a functional module 10 includes four cylindrical conductor projections 76. FIG. 18*b* shows three functional modules of the type shown in FIG. 18*a*, oriented in different directions along a power delivery module 22. In each orientation, different of the projections 76 contact (or are nearly contacting) the different conductors 24 and 26 of the power delivery module 22.

Figure 19:
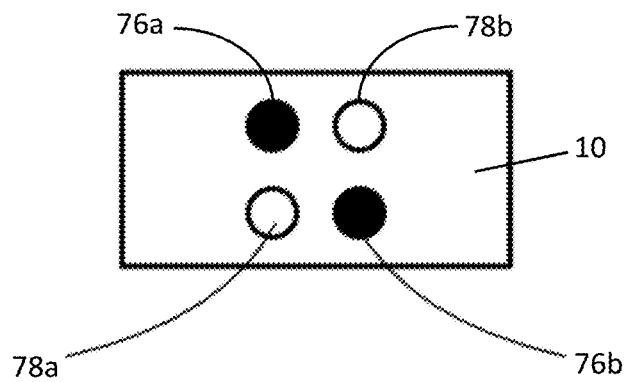
FIG. 19 is a bottom view of a functional module according to an exemplary embodiment.

In another example, a functional module includes one or more electrically conductive projections and one or more projections that are not electrically conductive. Such "dummy" projections may be used to provide positional stability or to assist in orienting the functional module with respect to a power delivery module. For example, as shown in FIG. 19, one side of a functional module 10 may include two electrically conductive projections 76 (for example, of the type shown in FIG. 17*a*) and two dummy projections 78 that are not electrically conductive. In one example, the dummy projections 78 may be integrally formed along with a housing of the functional module from injection molded plastic.

Figure 20:
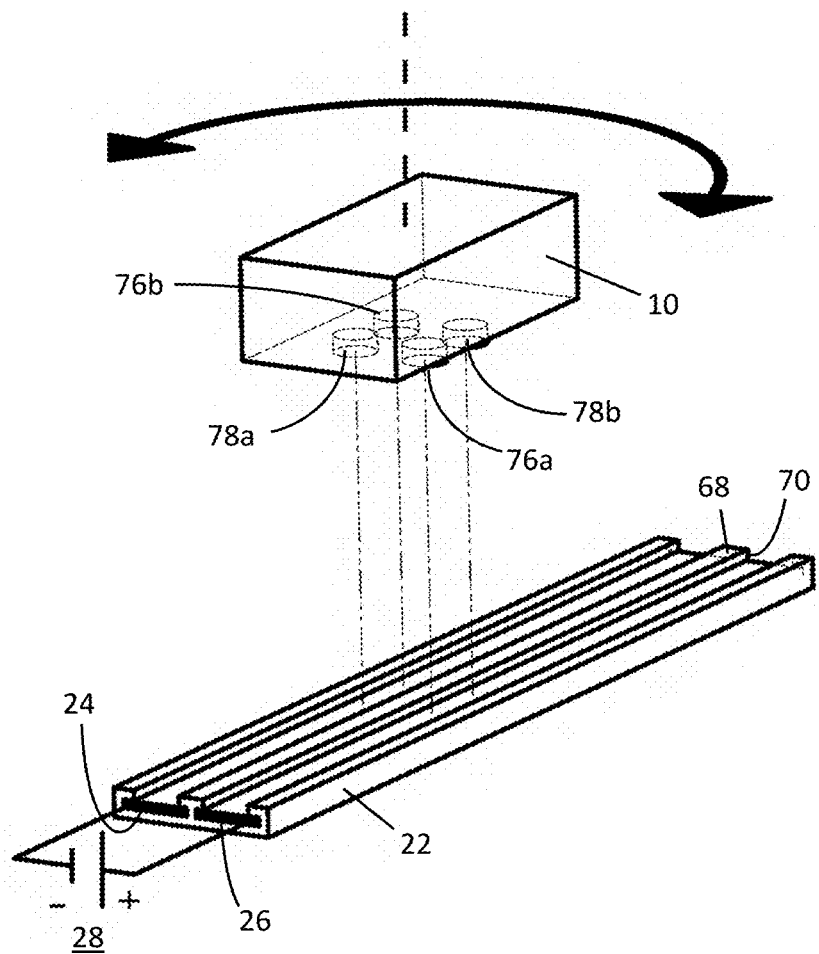
FIG. 20 is a perspective view of a functional module engaging with a power delivery module according to an exemplary embodiment.

In the example shown in FIG. 20, projections 76*b* and 78*a* of the functional module may initially be aligned with and contact conductor 24 of the power delivery module 22. Likewise, projections 76*a* and 78*b* may initially be aligned with and contact conductor 26. In this arrangement, projection 76*a* is connected to the positive lead of power supply 28 and projection 76*b* is connected to its negative lead. The sidewalls of opening 70 in the insulative web 68 of the power delivery module 22 keep the projections aligned along the respective conductors 24 and 26. The functional module is free to slide along the power delivery module while maintaining electrical connection, but the functional module is not free to rotate while electrically connected to the power delivery module. However, if a user removes the functional module from the power delivery module and rotates it 90, 180 or 270 degrees, the projections are arrayed such that functional module is re-attachable to the power delivery module in a different rotational orientation. If the user rotates the functional module 90 or 270 degrees (clockwise or counterclockwise), different polarity power will be received by the functional module. For example, as shown in FIG. 20, if the functional module 10 is rotated 90 degrees clockwise, projection 76*a* will be connected to the negative lead of power supply 28 through conductor 24 and projection 76*b* will be connected to the positive lead of power supply 28 through conductor 26.

In one example, turning a functional module to a different orientation along a power delivery module triggers an event or changes a feature of the functional module. For example, turning a functional module with a light 90 degrees may cause the light to dim, brighten or turn off, depending on a configuration of the module. Similarly, translational movement of a functional module along a power delivery module may be configured to trigger an event or change a feature of the functional module. For example, sliding a functional module with a light from one end of a power delivery module to the other end may cause the light to gradually dim or brighten.

In another example, portions of the power delivery module may be configured to cause predetermined effects in functional modules attached at those portions. For example, one section of a power delivery module may be configured with ferrous strips that are not connected to a power supply, resulting in accessories being unpowered when attached to that portion of the power delivery module.

Figure 21:
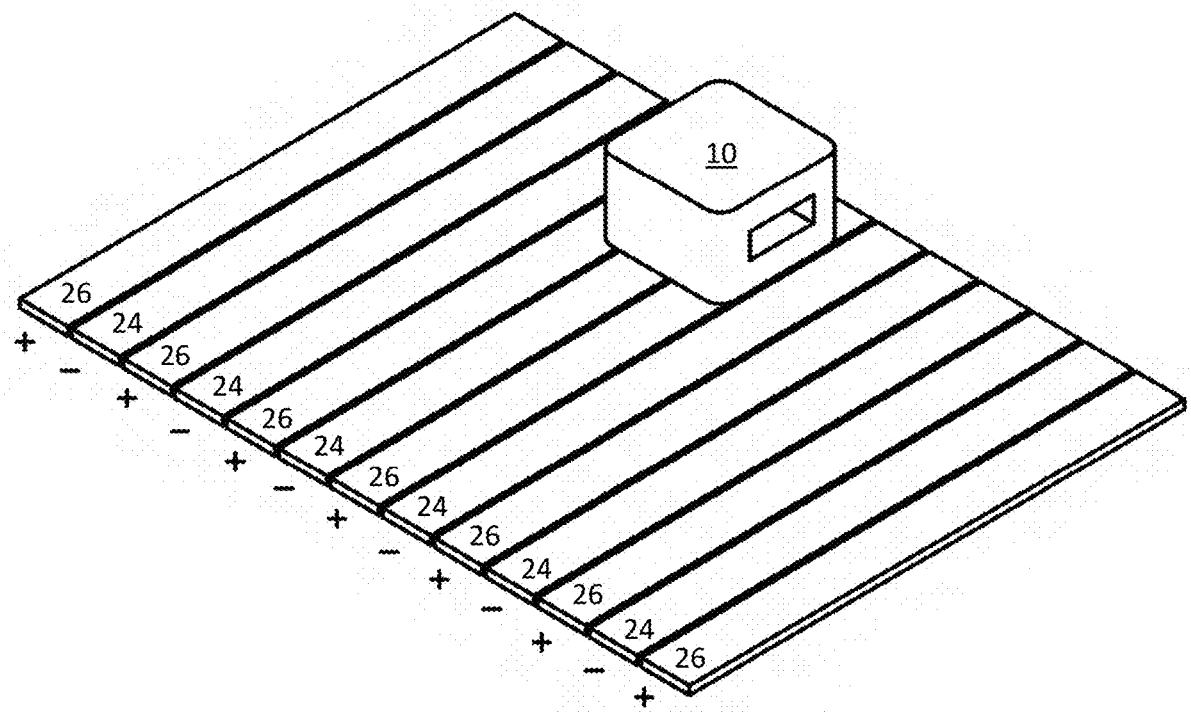
FIG. 21 is a perspective view of a functional module engaging with an array of conductors of a power delivery module according to an exemplary embodiment.

In another example, a power delivery module may include more conductors than functional modules have conductors. In this example, functional modules are connectable to different conductors of the power delivery module depending on a selection of a user and may receive power in each chosen position. FIG. 21 shows an example of an array of power delivery module conductors 24 and 26 arranged in alternating fashion. As shown, the conductors 24 and 26 may provide alternating connections to the negative and positive leads, respectively, of a power supply. All similar conductors may be connected with one another (e.g. all negative conductors 24 may be electrically bonded together) or may be isolated from one another. For example, different power supplies 28 may be connected to different conductors 24 and 26. In another example, all negative conductors 24 may be bonded, but conductors 26 may be attached to different power supplies 28, for example of different voltages and/or with different current delivery characteristics. In yet another example, arrayed conductors of a power delivery module may be of three or more types, for example to support functional modules that include more than three conductors such as those shown in FIGS. 14*a*, 14*b*, 15*a* and 15*b*.

Figure 22:
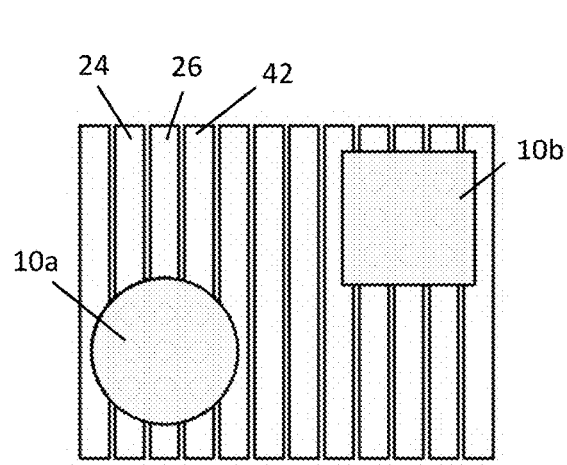
FIG. 22 is a top view of functional modules engaging with an array of conductors of a power delivery module according to an exemplary embodiment.
Figure 23:
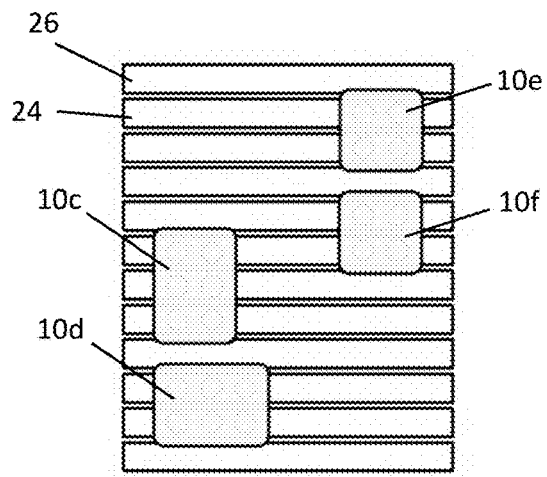
FIG. 23 is a top view of functional modules engaging with an array of conductors of a power delivery module according to an exemplary embodiment.

As shown in FIGS. 22 and 23, multiple functional modules 10*a*, 10*b*, 10*c*, 10*d*, 10*e* and 10*f* may be connected to an array of conductors in a power delivery module. In FIG. 22, three types of conductors 24, 26 and 42 are arrayed to support functional modules 10*a* and 10*b*, which each include cylindrical conductor projections to connect with three different types of conductors.

Figure 24:
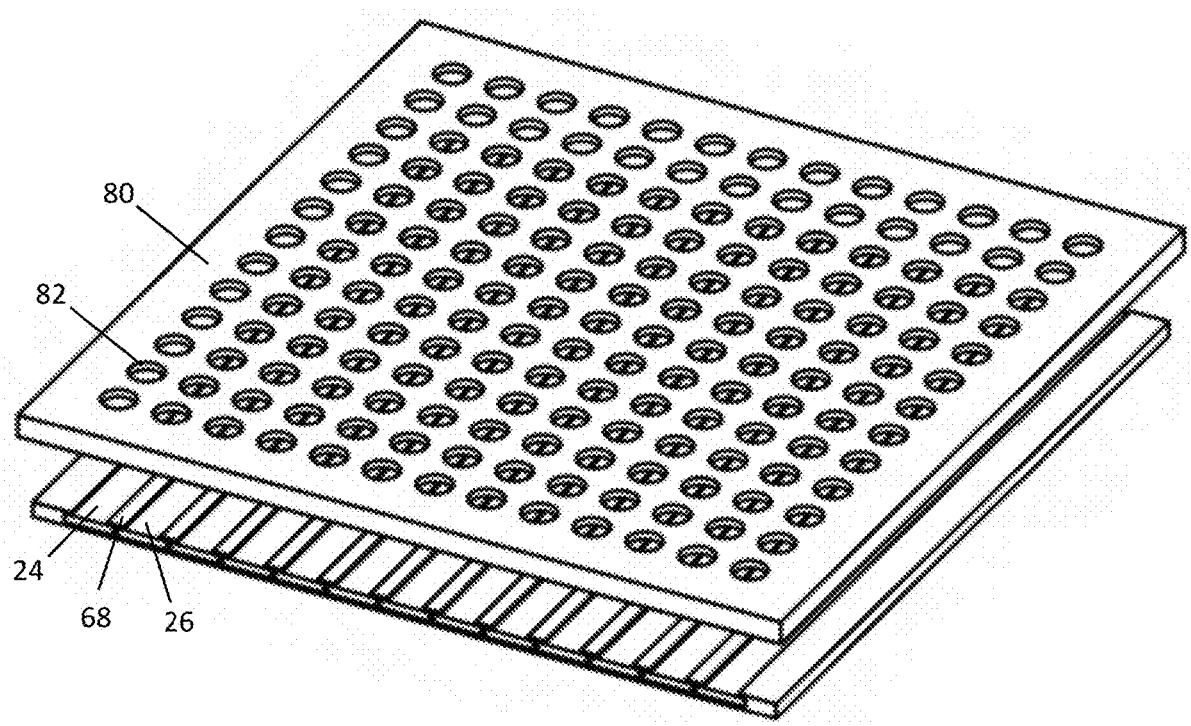
FIG. 24 is a perspective view of components of a power delivery module according to an exemplary embodiment.

In FIG. 24, an exemplary power delivery module is shown with a non-conducting cover 80 about to be affixed to a base comprising an insulative web 68 and conductors 24 and 26. The cover 80 includes holes 82 configured to accept projections of functional modules. The cover 80 may be configured to conceal from a user which holes correspond to which conductors and to present a visually uniform array of projection reception positions defined by the holes. In another example, the cover, holes and/or the conductors may be configured to visually signal which conductors are underneath which holes.

In one aspect, holes 82 in a cover may be configured with locking features that allow projections of a functional module to be mechanically locked to the cover and thus the power delivery module. For example, as shown in FIG.

Figures 25A, 25B, 25C:
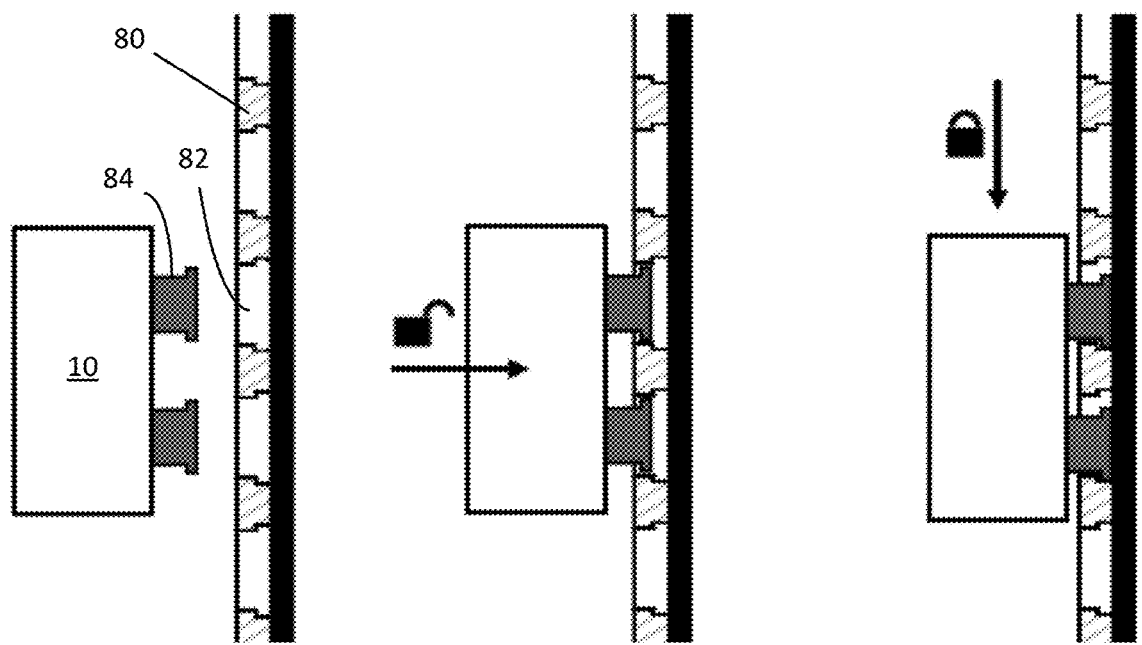
FIGS. 25a-25c are cross section views of a functional module engaging with a power delivery module according to an exemplary embodiment.

25a-c, projections 84 may include a stepped "nailhead" which is configured to be received by holes 82 (FIG. 25b) and then be locked in when the functional module 10 is shifted laterally by virtue of the projection nailheads engaging with corresponding undercuts in the cover 80. In another example, shown in FIGS. 26a-26c, projections 84 may be frustoconical and holes 82 may be correspondingly tapered.

The shapes of the holes 82 in covers 80 may correspond to the shape of projections of functional modules (e.g., cylindrical holes and projections) or may be dissimilar from them (e.g., cylindrical projections and square holes). FIGS. 27a-d show examples of covers 80 with cylindrical holes, square holes, hexagonal holes and slot-shaped holes with alternating orientations of their long axes, respectively.

Figure 28A:
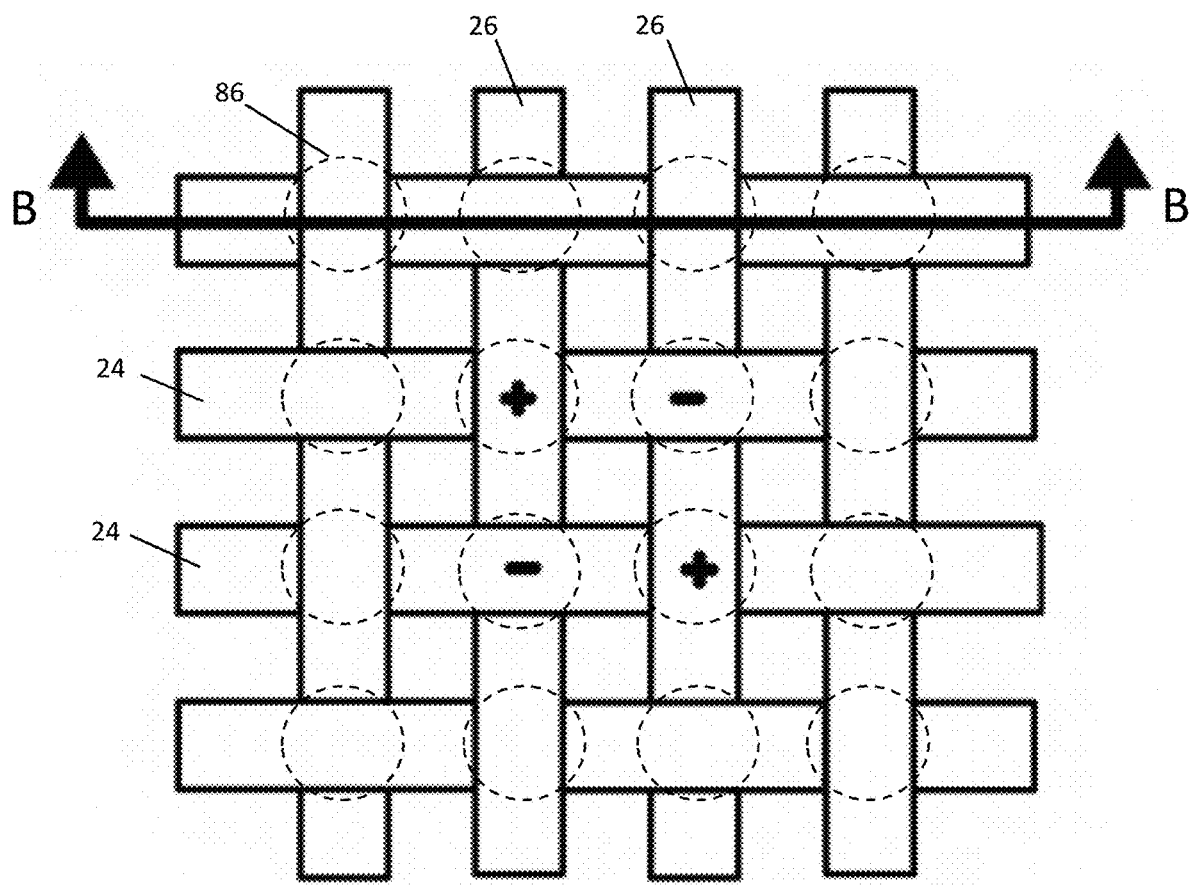
FIG. 28a is a top view of a power delivery module conductor array according to an exemplary embodiment.
Figure 28B:
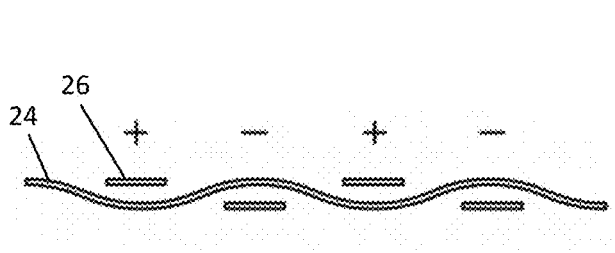
Figure 28C:
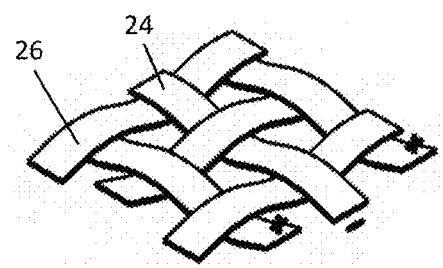

In another example, shown in FIG. 28a, conductors 24 and 26 of a power delivery module may be woven to present a checkerboard-type array of power polarities. Not shown are electrical insulators between overlapping conductors. Holes in a cover 80 may be aligned generally with the center of each conductor surface presented on one side of the woven surface, shown nominally by dotted lines 86. FIG. 28b shows a cross sectional view of the conductor array shown in FIG. 28a, taken along line B-B. FIG. 28c is a perspective view of a portion of the woven conductor array shown in FIG. 28a.

Figure 29:
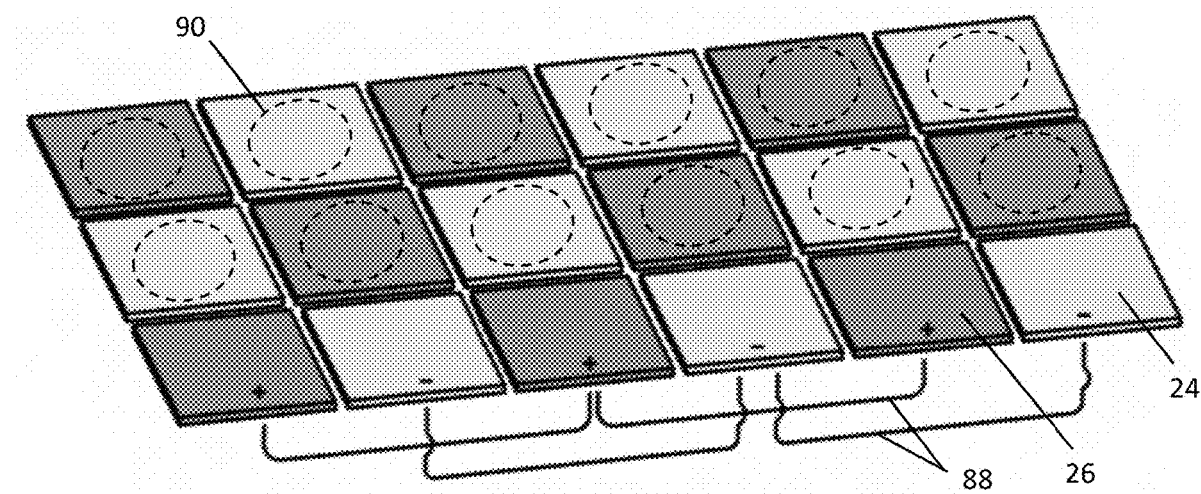
FIG. 29 is a perspective view of a power delivery module conductor array according to an exemplary embodiment.

FIG. 29 shows another example of a power delivery module conductor array with a checkerboard-type array of power polarities. In this example, conductors 24 and 26 are not woven, but are individually arrayed in a checkerboard pattern. Wiring, PC board traces, or other electrical conductor means 88 electrically connect ferrous conductors of like polarities. Holes in a cover 80 may be aligned with each conductor tile, shown nominally by dotted lines 90.

In addition, power delivery module conductor arrays may be formed in three dimensions. For example, as shown in FIG. 40a, a linear type power delivery module conductor array may be formed in three dimensions to create a cube or other rectangular prism. FIG. 40b shows a similar example of a power delivery module conductor array in a cube shape designed to accept "nailhead" or other type projections of functional modules on different sides thereof. Of course, other three-dimensional shapes are possible as well.

Figure 42A:
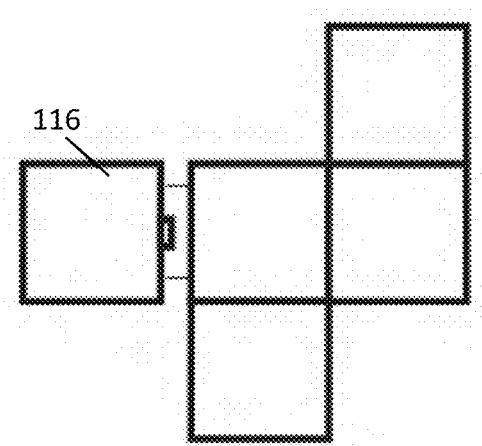
FIGS. 42a, 42b and 42c are plan views of power delivery module mosaics according to exemplary embodiments.
Figure 42B:
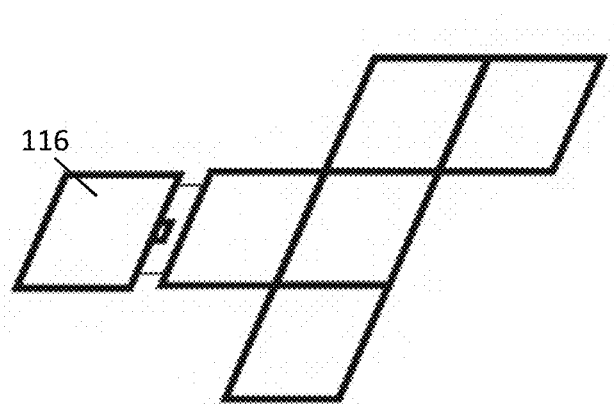
Figure 42C:
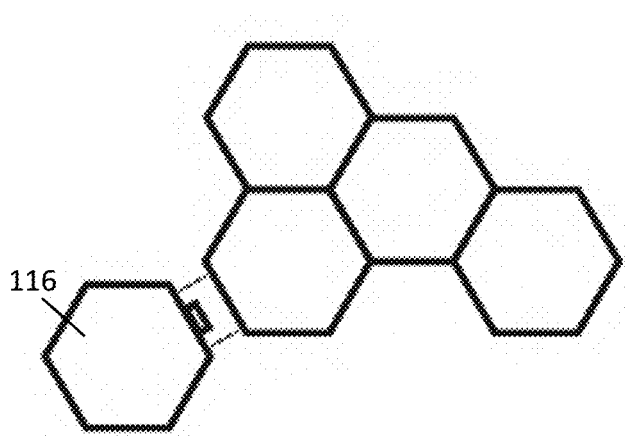

In another example, power delivery conductor arrays may be configured as interconnectable modules. For example, as shown in FIGS. 42a, 42b and 42c, power delivery conductor array modules 116 may be connected to one another to form larger mosaic arrays. While the arrays shown in FIG. 42 are depicted as existing in two dimensions, mosaic arrays of power delivery modules may also be configured in three dimensions. For example, the square modules shown in FIG. 42a may be configured to be connected to one another in three dimensions, resulting in a cube type array such as those shown in FIGS. 40a and 40b, with power delivery modules each forming a side of the cube. Dummy, or non-powered, modules may also be connectable to power delivery modules.

Figure 49:
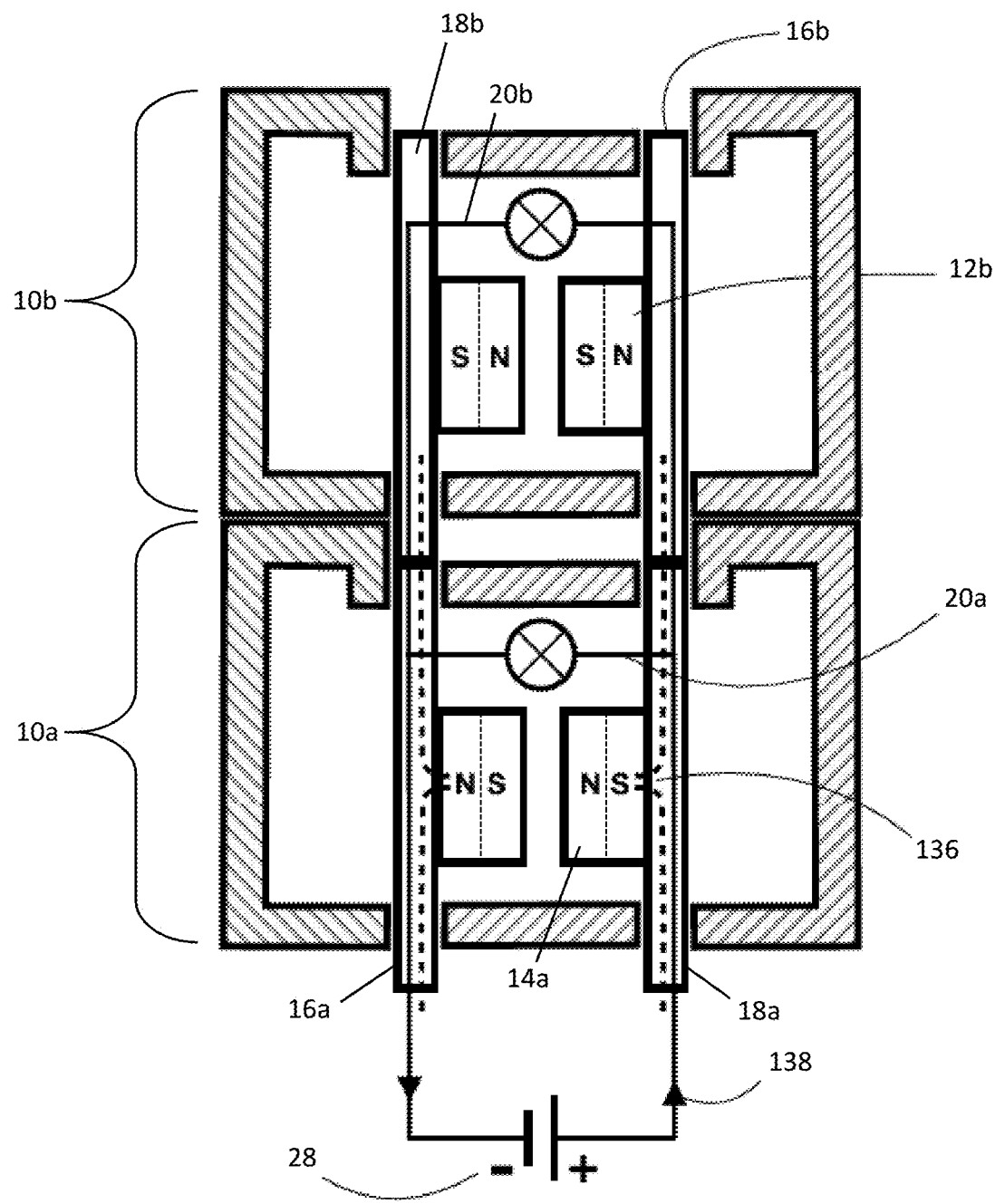
FIG. 49 shows a cross sectional view of interconnected functional modules according to an exemplary embodiment.

In another example, shown in FIG. 49, functional modules 10a and 10b may be configured as interconnectable modules. In this example, conductors have two exposed portions. As shown, conductors 16b and 18b of module 10b are attracted to and contact conductors 18a and 16a, respectively, of module 10a. Note that polarities of the magnets will dictate orientations in which conductors are attracted to and not repulsed by one another as a result of magnetic flux emanating from the magnets. For example, as shown, the magnetic flux 136 between magnet 14a and 12b induces attraction of the conductors 18a and 16b in the configuration shown. It should also be noted that power 138 received from power source 28 may be conducted through the conductors of the functional modules at the same time as magnetic flux. For example, in the configuration shown, power 138 is conducted from the power source 28 by conductors 16a and 18a, to circuitry 20a, and then on to conductors 18b and 16b of module 10b until it is finally received by circuitry 20b. Conductors 16b and 18b are exposed in two places, one being open in the configuration shown for accepting additional functional or power delivery modules.

Figure 50A:
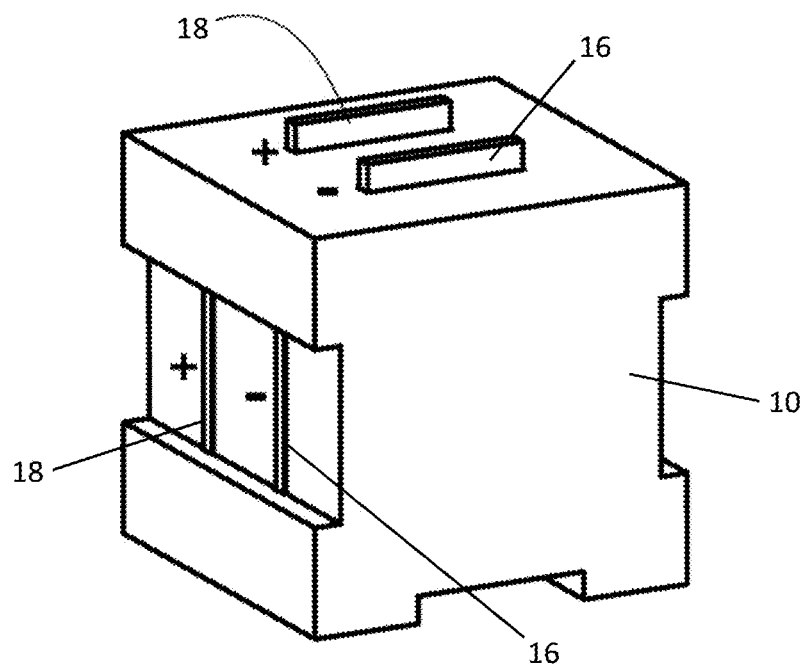
FIG. 50a shows a perspective view of an exemplary of a module that is configured with exposed portions of conductors on two perpendicular sides of the module according to an exemplary embodiment.
Figure 50B:
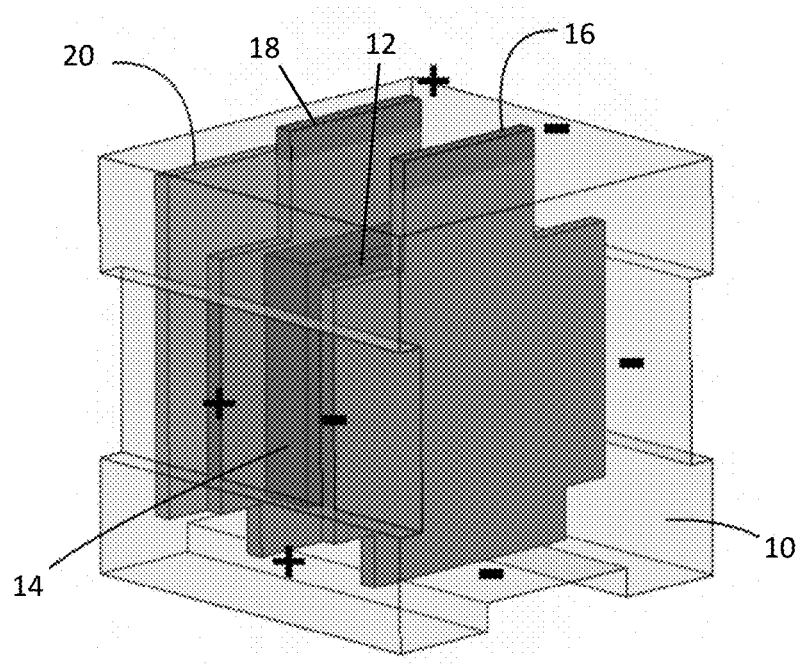
FIG. 50b shows a perspective, see-though view of a module in which conductors are exposed on four sides of the module according to an exemplary embodiment.
Figure 50C:
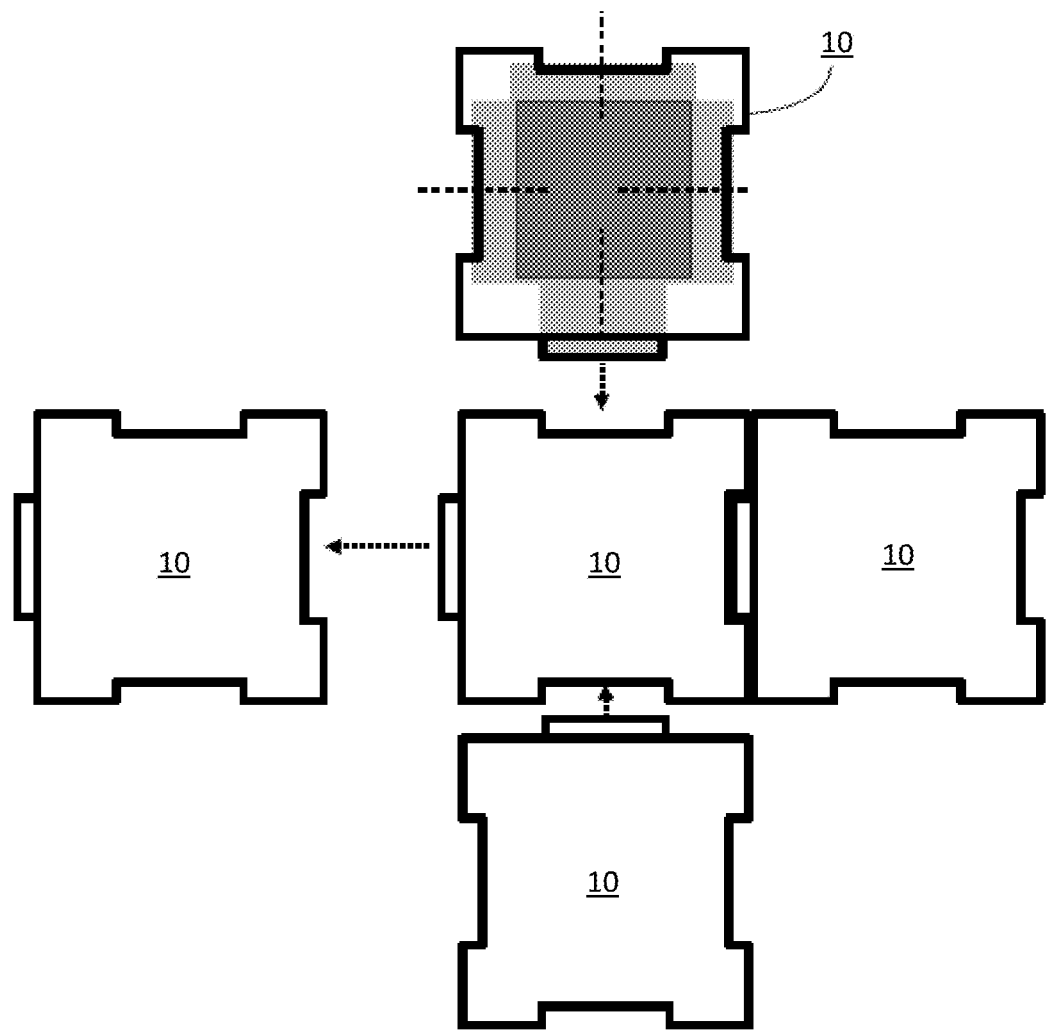
FIG. 50*c* shows a plan view of a mosaic of connected modules according to an exemplary embodiment.

FIG. 50a shows a perspective view of similar example of a module 10 that is configured with exposed portions of conductors 16 and 18 on two perpendicular sides of the module. FIG. 50b shows a perspective, see-through view of a module 10 in which conductors 16 and 18 are exposed on four sides of the module 10 in order to receive functional or power delivery modules thereon. As shown in FIG. 50b, magnets 12 and 16 may be configured to provide magnetic flux to each exposed portion of conductors 16 and 18, respectively. Circuitry 20 may be embedded within the module 10. As shown in FIG. 50c, many functional modules 10 may be interconnected to form a mosaic of connected modules. Although shown connected in a two dimensional mosaic in FIG. 50, functional modules may be configured to be connected in three dimensional mosaics as well.

Figure 30A:
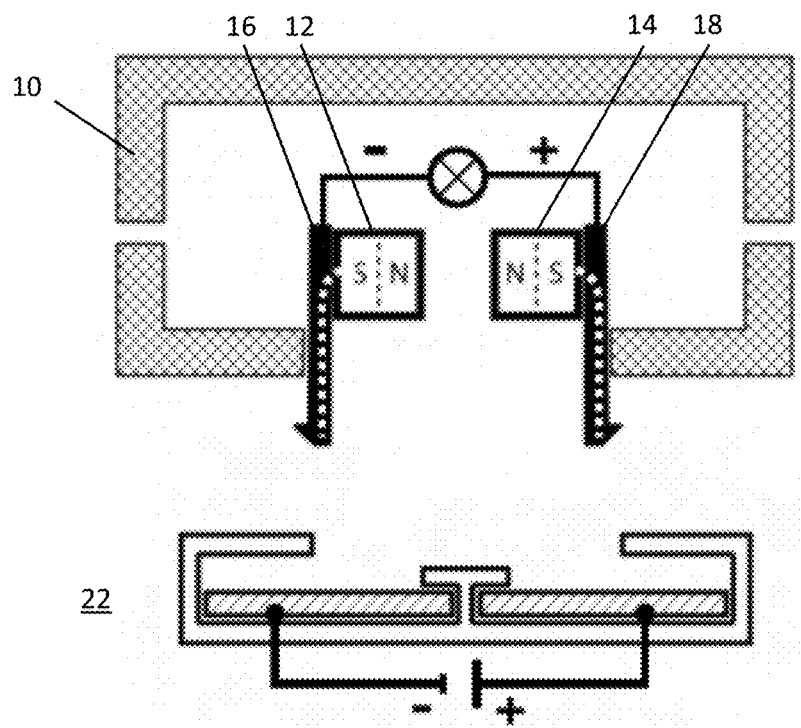
FIGS. 30a-30c are cross section views of a functional module engaging with a power delivery module according to an exemplary embodiment.
Figure 30B:
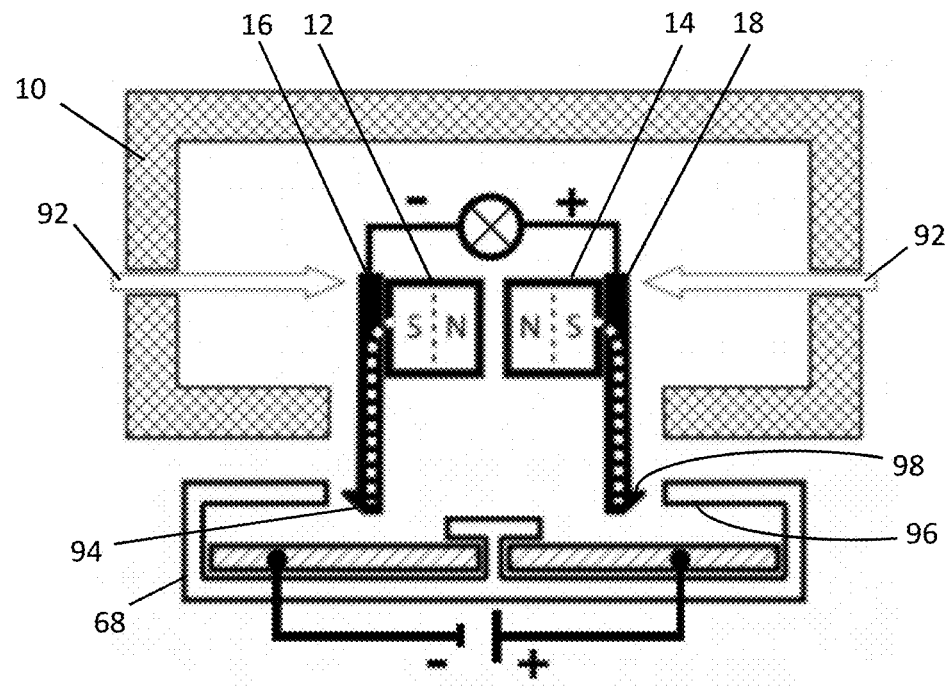
Figure 30C:
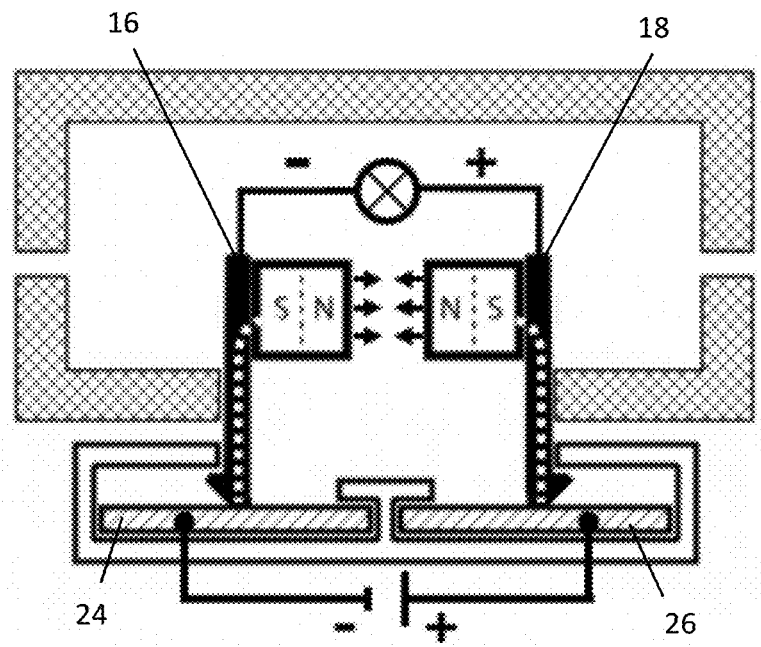

In another aspect, one or more magnets 12, 14 and/or conductors 16, 18 within functional module 10 may be configured to move to provide a mechanical locking of the functional module 10 to a power delivery module 22. In one example, shown in FIGS. 30a-c electromagnetic conductor assemblies 12-16 and 14-18 are configured to move in a translational manner towards and away from each other within functional module 10. As shown in FIG. 30a, the magnets 12 and 14 are aligned such that like polarities face one another, resulting in a repulsion force between electromagnetic conductor assemblies 12-16 and 14-18. As shown in FIG. 30b, a force 92 may be applied to electromagnetic conductor assemblies 12-16 and 14-18 to force them together to permit conductors 16 and 18 to enter insulative web 68. Alternatively, or in addition, a beveled surface 94 of conductors 16 and 18 may bear on an edge of the insulative web 68 to force conductors 16 and 18 inwards to permit entry. As shown in FIG. 30C, once inside insulative web 68, a hook surface 98 of conductors 16 and 18 engages with an underside of the insulative web 96 to mechanically lock the functional module 10 to the power delivery module 22. In this position, conductors 16 and 18 also contact the conductors 24 and 26 of power delivery module 22.

Figure 31A:
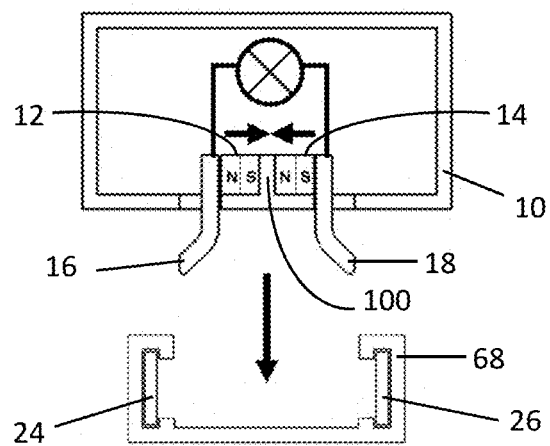
FIGS. 31a-31c are cross section views of a functional module engaging with a power delivery module according to an exemplary embodiment.
Figure 31B:
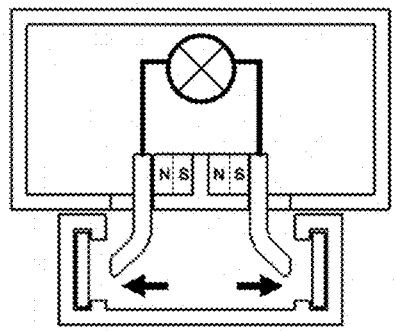
Figure 31C:
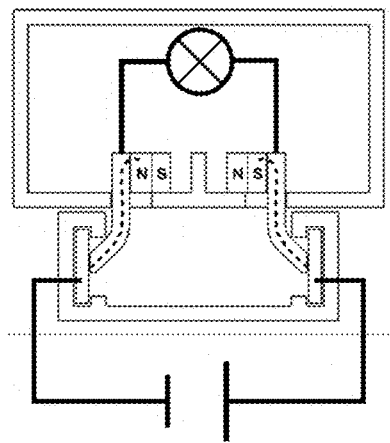

In another example, shown in FIGS. 31a-31c, power delivery module conductors 24 and may be oriented on opposite sides inside an insulative web 68. Moving electromagnetic conductor assemblies 12-16 and 14-18 of a functional module 10 move together to enter the web 68 and then move apart to connect electrically to conductors 24 and 26 and physically to the insulative web 68. As shown in FIG. 31a, the polarity of magnets 12 and 14 may be arranged such that they are attracted to one another to assist with insertion. However, once within insulative web 68, a proximity between conductors 16 and 18 and conductors 24 and 26 may be configured such that the attraction between conductors is greater than the attraction between magnets within the functional module, resulting in conductors contacting one another, forcing magnets apart. A finger 100 within the functional module may prevent the magnets 12 and 14 from coming into contact with one another.

Figure 32A:
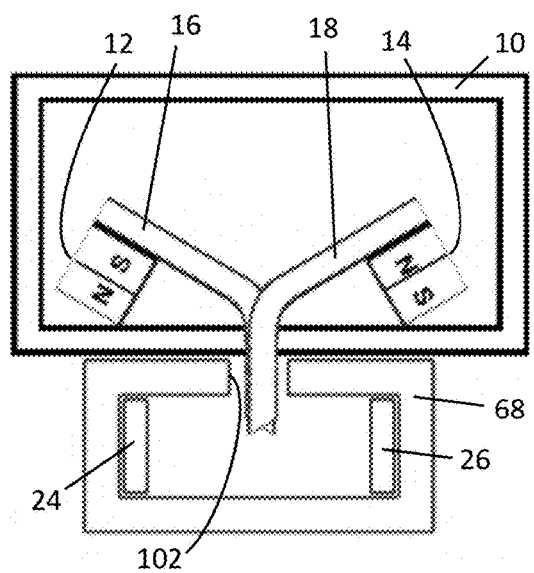
FIGS. 32a and 32b are cross section views of a functional module engaging with a power delivery module according to an exemplary embodiment.
Figure 32B:
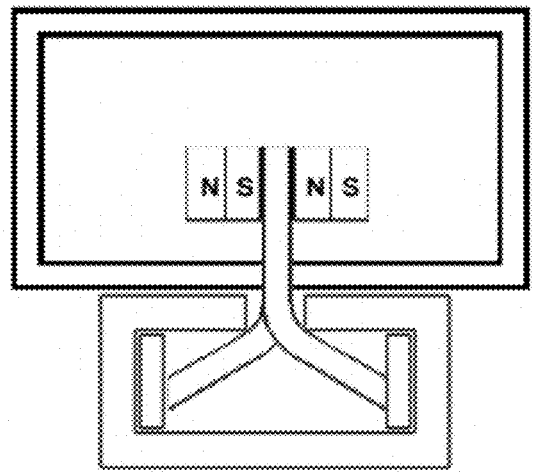
Figure 32C:
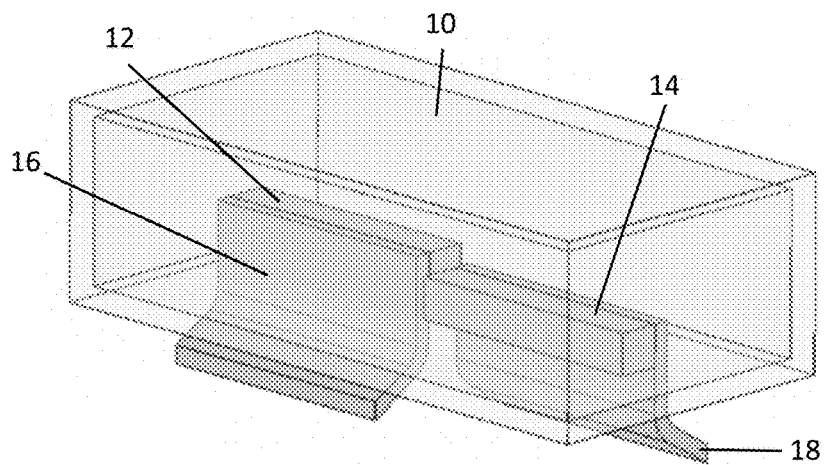
FIG. 32c is a perspective view of the functional module shown in FIGS. 32a and 32b.

In yet another example, electromagnetic conductor assemblies may be configured to rotate within a functional module. For example, as shown in FIG. 32a-32c, electromagnetic conductor assemblies 12-16 and 14-18 of a functional module 10 may be configured to rotate from an unlocked position shown in FIG. 32a in which conductors are generally aligned to a locked position shown in FIG. 32b in which conductors 16 and 18 are deployed in a wing-like fashion within insulative web 68. As shown in FIG. 32c, electromagnetic conductor assemblies 12-16 and 14-18 may be arrayed beside one another along a direction of a slot 102 of an insulative web 68.

Figure 33A:
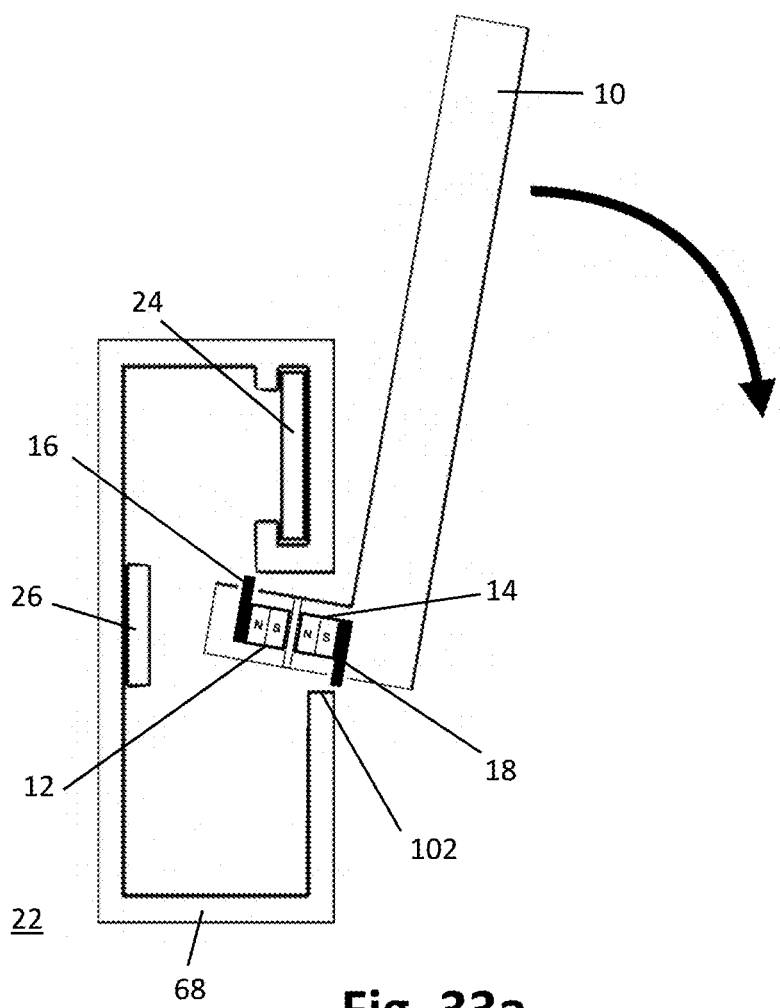
FIGS. 33a and 33b are cross section views of a functional module engaging with a power delivery module according to an exemplary embodiment.
Figure 33B:
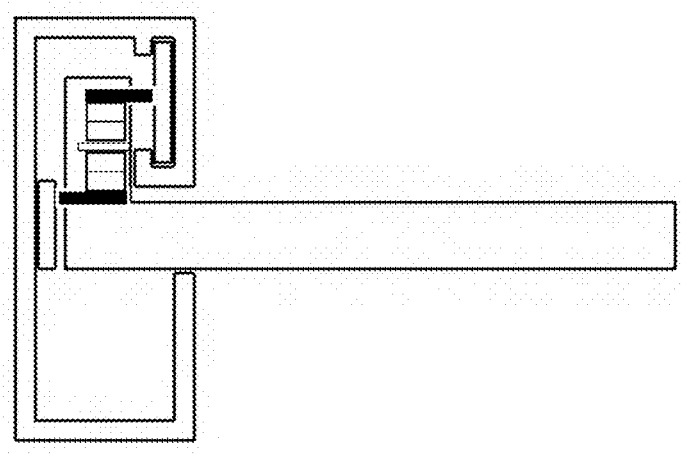

In another example, shown in FIGS. 33a and 33b, magnets 12 and 14 and conductors 16 and 18 of a functional module 10 may be arranged on a leg of the functional module configured to enter a channel within a power delivery module. Conductors 16 and 18 of the functional module are configured on opposite sides of the leg, with one facing away from a remainder of the functional module (e.g., conductor 16) and one facing towards a remainder of the functional module (e.g., conductor 18). Within the power delivery module 22, one conductor faces an entry slot 102 in an insulative web 68 (e.g., conductor 24) and one faces away (e.g., conductor 26). The leg of the functional module is configured to enter the slot 102 first, then the entire functional module 10 is rotated to place the leg further within the power delivery module until conductor pairs 16-24 and 18-26 contact. At this time, an underside of the functional module may also be configured to contact a side of slot 102. In this arrangement, functional module 10 is provided with substantial strength and rigidity, sufficient to function as a shelf for holding objects thereon.

Figure 34:
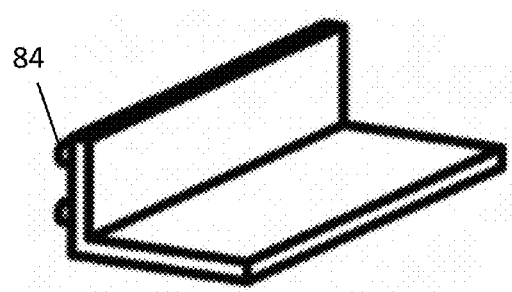
FIG. 34 is a perspective view of a functional module according to an exemplary embodiment.
Figure 35:
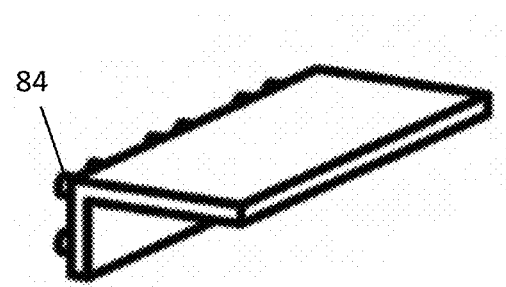
FIG. 35 is a perspective view of a functional module according to an exemplary embodiment.

In another example of a shelf functional module, shown in FIGS. 34 and 35, a shelf includes projections 84 on a leg thereof that are configured to engage with holes 82 in the cover 80 of a power delivery module 22 having locking features, such as is shown in FIGS. 25a-c and 26a-c.

Figure 36:
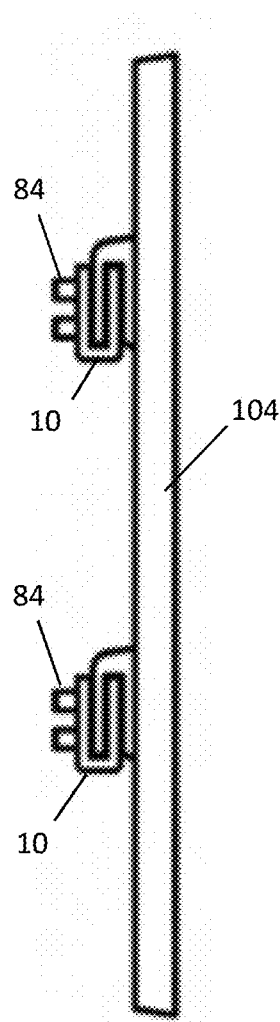
FIG. 36 is a side view of functional modules engaging with an object according to an exemplary embodiment.

In another example, one or more functional modules may be configured as a hook, with an upward projecting front leg, configured to support a mating hook or another object, such as a cell phone or tablet computer. For example, as shown in FIG. 36, a flat panel display or television 104 is supported by two hook functional modules 10, each including locking projections 84 configured to engage with holes 82 in the cover 80 of a power delivery module 22 having locking features, such as is shown in FIGS. 25a-c and 26a-c. In a similar example, one or more functional modules may provide a French cleat type connection with beveled mating surfaces.

A similar example is shown in FIG. 37a and 37b, in which functional modules 10 include locking projections 84 and are received in receptacles 106 in or attached to an object 104 such as a flat panel display or television.

In any example in which a functional module is configured to support another object, connectivity features may be included in the functional module (including wireless connectivity features) to communicate electrical power or signals from conductors of the power delivery module, through the functional modules(s) to the supported object.

In another aspect, a power delivery module 22 may include a lighting feature. For example, as shown in FIG. 38, a power delivery module may be configured to include conductors 24 and 26 as in other examples as well as lights 108. In one example, lights 108 are led strips with LED elements spaced at intervals along a length of the module. As shown in FIG. 38, the lights may be directed into the module's web 68 and the module may include a transparent or translucent diffuser strip 110 to permit the light to escape the module. In the example shown, the diffuser 110 is attached to conductors 24 and 26 while allowing a portion of conductors 24 and 26 to be accessible to functional modules. In this example, the lights 108 may be bonded to the conductors 24 and 26 in such a way that the conductors serve also serve as heat sinks for the lights.

Figure 45:
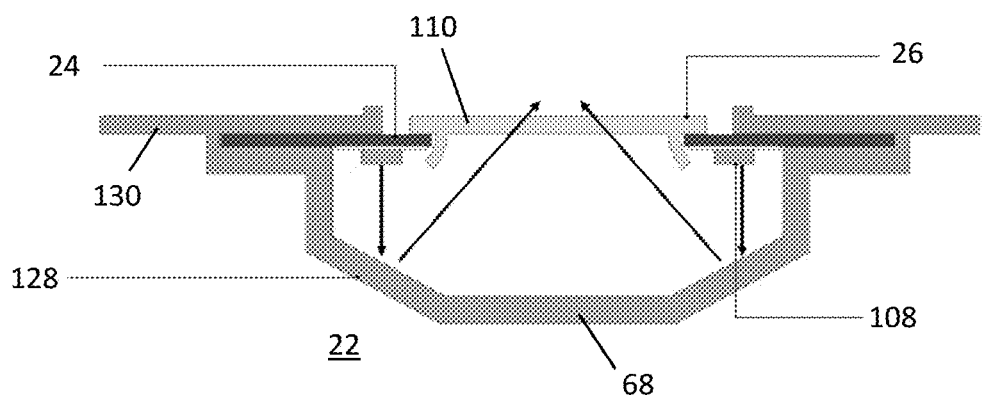
FIGS. 45-47 show cross section views of additional examples of power delivery modules with lighting features according to exemplary embodiments.

Another example of a power delivery module 22 with a lighting feature is shown in FIG. 45. In this example, lights 108 (which may again be LED strips) are directed down towards beveled portions 128 of the module's web 68. The beveled portions 128 redirect light out through a transparent or translucent diffuser strip 110. The module's web 68 may also include flanges 130 for flush mounting the module 22.

Figure 46:
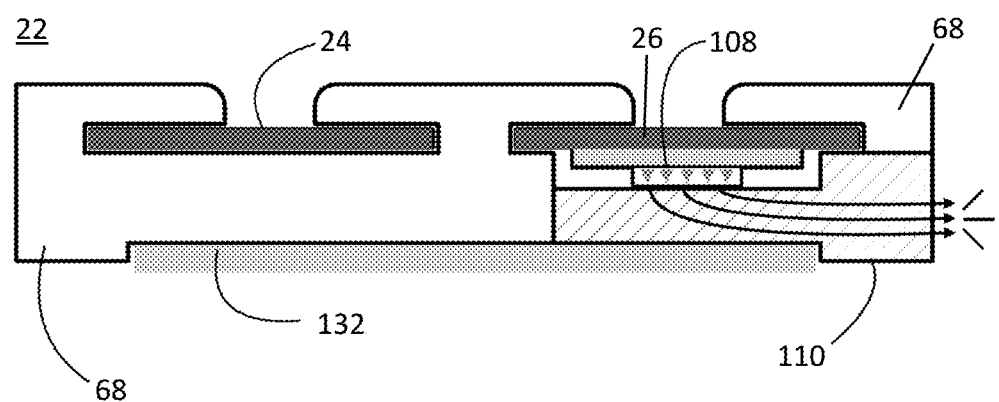

Another example of a power delivery module 22 with a lighting feature is shown in FIG. 46. In this example, a light 108 (which may again be LED strips) is opposite the exposed side of a conductor and its luminance is directed through a transparent or translucent diffuser 110 such that the luminance is redirected from the direction it leaves the light 108. In one example, attaching an LED strip to a conductor allows the heat emitted by the LED's to dissipate through the metal of the conductor, increasing the lifetime of the LED strips. In this configuration, the conductor acts as a heat sink for the LED strip. In the example shown in FIG. 46, the luminance is redirected by approximately 90 degrees so that it exits the module 22 through a side thereof perpendicular to the exposed surface of conductor 26. Any degree of redirection is possible and compatible with this aspect of the disclosure. In addition, although FIG. 46 shows one light 108, more lights may be added, for example to the underside of conductor 24. An adhesive or adhesive tape 132 may be provided for mounting the module 22 to a surface. In the configuration shown in FIG. 46, when mounted to a surface using adhesive 132, the luminance from light 108 would be redirected substantially parallel to that surface. In one example, web 68 may be extruded from a non-conducting material such as plastic and diffuser 110 may be co-extruded therewith or else separately formed or extruded and subsequently bonded or attached thereto.

Figure 47:
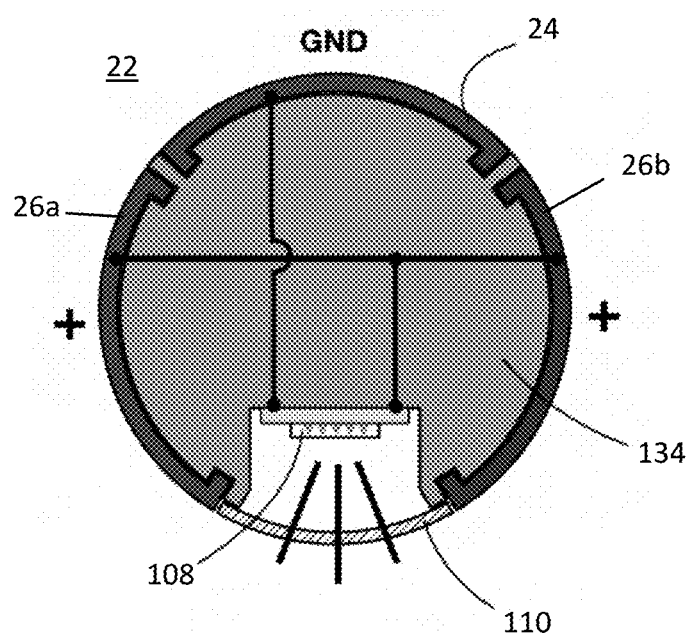

Another example of a power delivery module 22 with a lighting feature is shown in FIG. 47. In this example, the module 22 is formed as an elongate rod with a ground conductor 24 and two electrically interconnected positive conductors 26a and 26b. A light 108 is included within the module and is directed outward through diffuser 110. The module may include a structural core 134 that may be configured as a solid material that gives rigidity to the module. For example, the structural core 134 may be comprised of a non-conductive extruded material such as plastic or, in another example, of a hardened, initially flowable material such as epoxy.

Figure 48A:
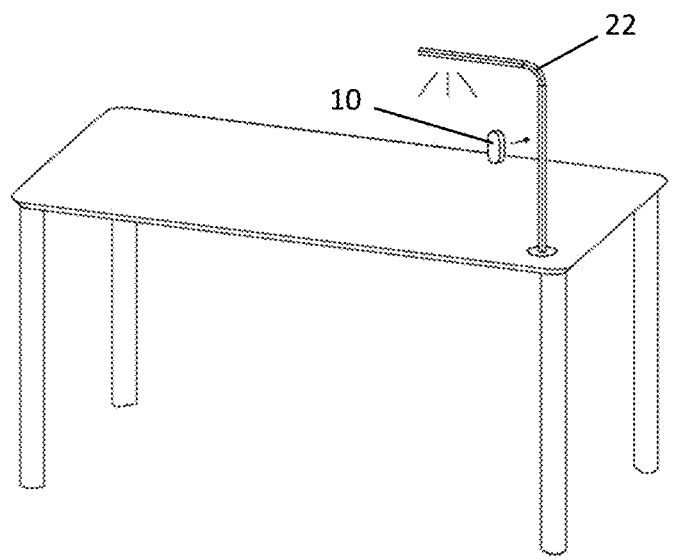
FIGS. 48a and 48b are perspective views of power delivery modules in rod form that have lighting features according to exemplary embodiments.
Figure 48B:
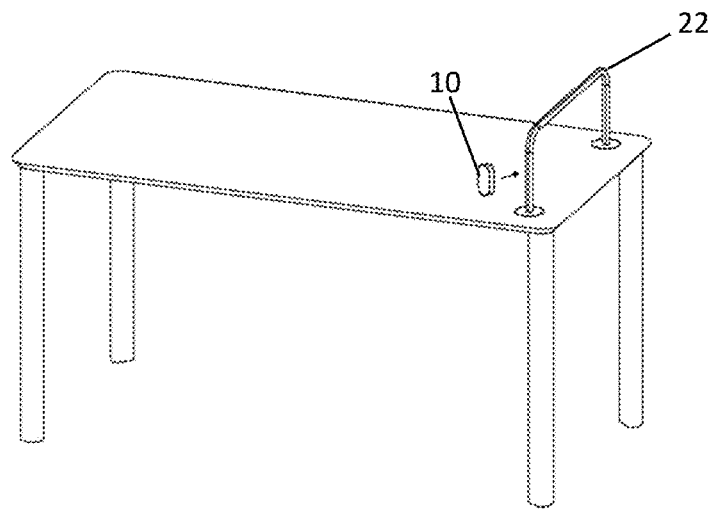
Figure 48C:
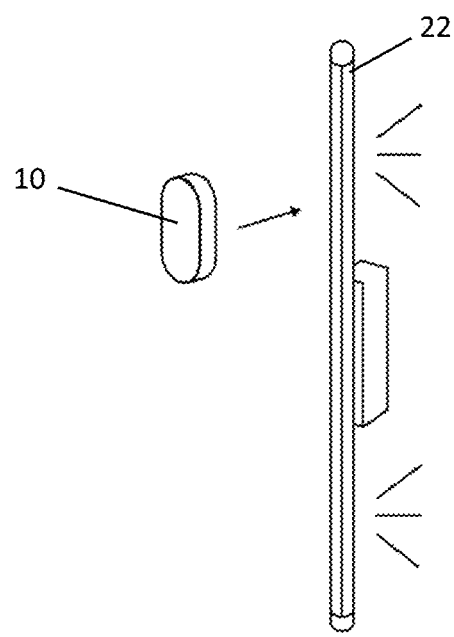
FIG. 48c is a perspective view of a power delivery module with a lighting feature that is configured as a surface mount module according to an exemplary embodiment.

FIGS. 48a and 48b are perspective views of power delivery modules 22 in rod form that have lighting features. As depicted, the power delivery modules are integrated into (or placed on top of) a table and are configured such that luminance from the lighting feature is directed down towards the table surface. FIG. 48c is a perspective view of a power delivery module 22 with a lighting feature that is configured as a surface mount module. Luminance from the lighting feature is directed back towards or parallel along the surface to which the module 22 is mounted. In each of the examples shown in FIGS. 48a, 48b and 48c, a functional module 10 is attachable to the power supply module 22 at any point along its length.

Figure 39A:
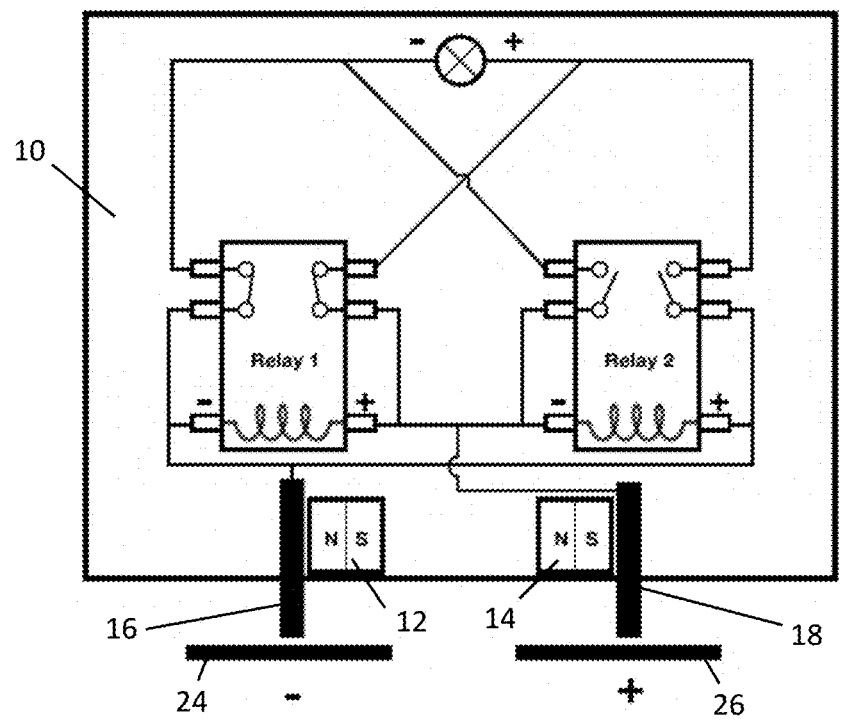
FIGS. 39a and 39b are schematic cross section views of a power delivery module engaging with a functional module that includes an automatic polarity reversing feature according to an exemplary embodiment.
Figure 39B:
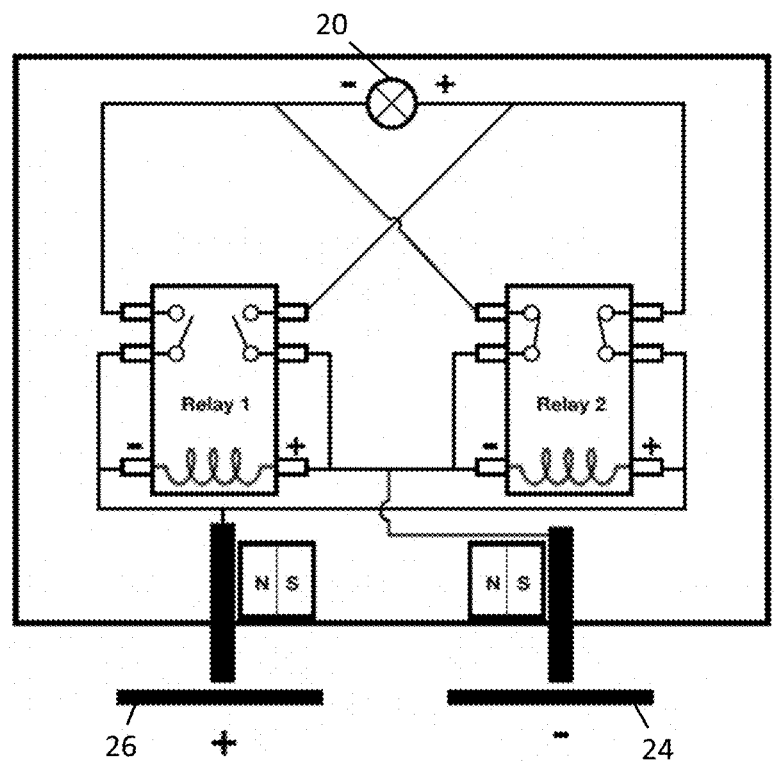

In another aspect, circuitry of functional modules may include an automatic polarity reversing feature to enable aspects of the circuitry to function the same no matter what orientation a functional module engages with a power delivery module. In the example shown in FIGS. 39*a* and 39*b*, no matter the polarity of the conductors 24 and 26 to which the functional module 10 is connected, the circuitry 20 of the functional module 10 receives the same polarity power. In the example shown, Relay 1 and Relay 2 are each normally open, double pole single throw relays with a unidirectional coil. That is, the coil only actuates the relay if power is applied across it with a certain polarity. Such a function may be conferred with an inline diode, for example. The diode may be built into the relays or may be included externally to the relays.

A broad array of functional modules are compatible with the innovations disclosed herein. For example, in addition to the functional modules described above, other functional modules compatible with the innovations described herein include, but are not limited to powered functional modules such as a USB connector (e.g., 112 in FIG. 7), a wired or wireless electronic device charger or dock, a fan, a clock or timer, a visual display, a smart picture frame, an audiovisual accessory, a speaker, a camera, sensors (e.g, temperature, humidity, vibration, infrared, etc.), data capture accessories for Internet of Things (IoT) applications, machine learning accessories, Artificial Intelligence accessories, geofencing accessories, GPS accessories, Augmented Reality (AR) accessories, Virtual Reality (VR) accessories, Mixed Reality (MR) accessories, etc. Functional modules may also be unpowered, for example, writing implement holders (e.g., 114 in FIG. 7), stationary trays, business card holders, flower vases, unpowered storage shelves, hooks, traditional picture frames, interior decorating items such as cloth, curtains, accents, etc., tool holders, mirrors, toothbrush holders, knife racks, spice racks, utensil holder, drawing boards, toys, key holders, etc.

The innovations described herein are applicable in a wide range of settings and applications. For example, applications of the innovations described herein may be realized in homes (including mobile homes and prefabricated homes), offices, hotels and hotel rooms, schools and classrooms, restaurants, hospitals and hospital rooms, factories, airports, transportation (including on vehicles such as automobiles, recreational vehicles, trains, boats, ships, ferries, cruise ships, and airplanes). As another example, the innovations described herein may be applied to furniture such as cabinets, tables, desks, benches, racks, shelves, doors, door or window frames, etc. As a further example, the innovations described herein may be applied as architectural elements, for example in interiors or exteriors as one or more surface mounted, recessed or flush mounted modules.

In order to address various issues and advance the art, the entirety of this application (including the Cover Page, Title, Headings, Background, Summary, Brief Description of the Drawings, Detailed Description, Claims, Abstract, Figures, and otherwise) shows, by way of illustration, various embodiments in which the claimed present subject matters may be practiced. The advantages and features of the application are of a representative sample of embodiments only, and are not exhaustive and/or exclusive. They are presented only to assist in understanding and teach the claimed principles. It should be understood that they are not representative of all claimed present subject matters. As such, certain aspects of the disclosure have not been discussed herein. That alternative embodiments may not have been presented for a specific portion of the present subject matter or that further undescribed alternate embodiments may be available for a portion is not to be considered a disclaimer of those alternate embodiments. It may be appreciated that many of those undescribed embodiments incorporate the same principles of the present subject matters and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. Also, some of these embodiments and features thereof may be mutually contradictory, in that they cannot be simultaneously present in a single embodiment. Similarly, some features are applicable to one aspect of the present subject matter, and inapplicable to others. In addition, the disclosure includes other present subject matters not presently claimed. Applicant reserves all rights in those presently unclaimed present subject matters including the right to claim such present subject matters, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of modular electromagnetic connection user, various embodiments of the modules employing such connections be implemented that enable a great deal of flexibility and customization.

What is claimed is:

1. A modular system, comprising:
 a functional module comprising:
  at least a first and second ferrous conductor at least partially exposed to an exterior of the functional module,
  a first magnet contacting the first ferrous conductor,
  a second magnet contacting the second ferrous conductor and electrically isolated from the first magnet and the first conductor, and
  circuitry electrically connected to the first and second ferrous conductors, wherein
  the first and second ferrous conductors are configured to channel and focus magnetic flux from the first and second magnets, respectively, thereby increasing a strength of magnetic flux at the exposed portions of the ferrous conductors to a level greater than would be present there with the magnets alone, while at the same time the first and second ferrous conductors are configured to electrically conduct power to the circuitry;
 a second functional module comprising:
  at least a first and second ferrous conductor at least partially exposed to an exterior of the second functional module,
  a first magnet contacting the first ferrous conductor,
  a second magnet contacting the second ferrous conductor and electrically isolated from the first magnet and the first conductor, and
  circuitry electrically connected to the first and second ferrous conductors; and
 a power delivery module comprising first and second ferrous power delivery conductors and a power supply electrically connected to the first and second ferrous power delivery conductors, wherein the first and second ferrous conductors of the functional module are configured to be magnetically attracted to, contact, and receive power from the first and second ferrous power delivery conductors, respectively, the first and second ferrous conductors are configured to channel and focus magnetic flux from the first and second magnets, respectively, thereby increasing a strength of magnetic flux at the exposed portions of the ferrous conductors to a level greater than would be present there with the magnets alone, while at the same time the first and second ferrous conductors are configured to electrically conduct power to the circuitry, the power delivery module includes more ferrous power delivery conductors than either the functional module or the second functional module has ferrous conductors, and the circuitry of the functional module and the circuitry of the second functional module are operational at least when the ferrous conductors of the functional module contact a set of ferrous power delivery conductors that is not identical to a set of ferrous power delivery conductors contacted by the ferrous conductors of the second functional module.

2. The modular system of claim 1, wherein
the functional module further comprises a third ferrous conductor at least partially exposed to an exterior of the functional module and a third magnet adjacent the third ferrous conductor, the third magnet being electrically isolated from the first and second magnets and also the first and second ferrous conductors and the third ferrous conductor of the functional module is configured to communicate data with the circuitry and the power delivery module includes a ferrous data conductor configured to be magnetically attracted to, contact, and communicate data with the third ferrous conductor of the functional module.

3. The modular system of claim 1, wherein the first and second ferrous power delivery conductors are elongate in shape and arrayed in parallel to one another along their longest dimension.

4. The modular system of claim 3, wherein the first and second ferrous power delivery conductors are curved in three dimensions.

5. A modular system, comprising:
a functional module comprising:
at least a first and second ferrous conductor at least partially exposed to an exterior of the functional module,
a first magnet contacting the first ferrous conductor,
a second magnet contacting the second ferrous conductor and electrically isolated from the first magnet and the first conductor, and
circuitry electrically connected to the first and second ferrous conductors, wherein
the first and second ferrous conductors are configured to channel and focus magnetic flux from the first and second magnets, respectively, thereby increasing a strength of magnetic flux at the exposed portions of the ferrous conductors to a level greater than would be present there with the magnets alone, while at the same time the first and second ferrous conductors are configured to electrically conduct power to the circuitry; and
a power delivery module comprising first and second ferrous power delivery conductors and a power supply electrically connected to the first and second ferrous power delivery conductor, wherein the first and second ferrous conductors of the functional module are configured to be magnetically attracted to, contact, and receive power from the first and second ferrous power delivery conductors, respectively, the first ferrous conductor of the functional module is configured to be magnetically attracted to, contact, and receive power from either the first ferrous power delivery conductor or the second power delivery conductor, the second ferrous conductor of the functional module being magnetically attracted to, contacting, and receiving power from the other of the first ferrous power delivery conductor and the second power delivery conductor and the circuitry is configured to have a first function if the first ferrous conductor of the functional module receives power from the first ferrous power delivery conductor and a second function if the first ferrous conductor of the functional module receives power from the second power delivery conductor.

6. A modular system, comprising:
a functional module comprising:
at least a first and second ferrous conductor at least partially exposed to an exterior of the functional module,
a first magnet contacting the first ferrous conductor,
a second magnet contacting the second ferrous conductor and electrically isolated from the first magnet and the first conductor, and
circuitry electrically connected to the first and second ferrous conductors, wherein
the first and second ferrous conductors are configured to channel and focus magnetic flux from the first and second magnets, respectively, thereby increasing a strength of magnetic flux at the exposed portions of the ferrous conductors to a level greater than would be present there with the magnets alone, while at the same time the first and second ferrous conductors are configured to electrically conduct power to the circuitry;
a power delivery module comprising first and second ferrous power delivery conductors and a power supply electrically connected to the first and second ferrous power delivery conductors; and
a second power delivery module comprising first and second ferrous power delivery conductors, the first and second ferrous power delivery conductors of the power delivery module and the second power delivery module, respectively, being electrically connected to one another, wherein
the first and second ferrous conductors of the functional module are configured to be magnetically attracted to, contact, and receive power from the first and second ferrous power delivery conductors, respectively, and
the first and second ferrous conductors of the functional module are configured to be magnetically attracted to, contact, and receive power from the first and second ferrous power delivery conductors, respectively, of either the power delivery module or the second power delivery module.

7. The modular system of claim 5, wherein the power delivery module comprises a third ferrous power delivery conductor and includes more ferrous power delivery conductors than the functional module has ferrous conductors.

8. The modular system of claim 5, wherein
the power delivery module includes more ferrous power delivery conductors than the functional module has ferrous conductors, the first and second ferrous power delivery conductors are elongate in shape and arrayed in parallel to one another along their longest dimension, and the power supply is connected to the arrayed ferrous power delivery conductors with alternating power polarities.

9. A modular system, comprising:
a functional module comprising:
- at least a first and second ferrous conductor at least partially exposed to an exterior of the functional module,
- a first magnet contacting the first ferrous conductor,
- a second magnet contacting the second ferrous conductor and electrically isolated from the first magnet and the first conductor, and
- circuitry electrically connected to the first and second ferrous conductors, wherein
- the first and second ferrous conductors are configured to channel and focus magnetic flux from the first and second magnets, respectively, thereby increasing a strength of magnetic flux at the exposed portions of the ferrous conductors to a level greater than would be present there with the magnets alone, while at the same time the first and second ferrous conductors are configured to electrically conduct power to the circuitry; and a power delivery module comprising first and second ferrous power delivery conductors and a power supply electrically connected to the first and second ferrous power delivery conductor, wherein the first and second ferrous conductors of the functional module are configured to be magnetically attracted to, contact, and receive power from the first and second ferrous power delivery conductors, respectively, the first and second ferrous conductors of the functional module are projections that project from an outer surface of the functional module, the power delivery module includes a cover having discrete openings therein exposing the first and second ferrous power delivery conductors to an exterior of the power delivery module, the openings each being configured to receive only one functional module projection, thereby defining discrete attachment positions between the functional module and the power delivery module, and the openings in the cover of the power delivery module expose ferrous power delivery conductors in a checkerboard-type array of power polarities.

* * * * *